US012586409B2

(12) United States Patent
Chang et al.

(10) Patent No.: US 12,586,409 B2
(45) Date of Patent: Mar. 24, 2026

(54) DETECTING EMOTIONAL STATE OF A USER BASED ON FACIAL APPEARANCE AND VISUAL PERCEPTION INFORMATION

(71) Applicants: The Regents of the University of Michigan, Ann Arbor, MI (US); Yuhu Chang, Shanghai (CN); Yingying Zhao, Shanghai (CN); Qin Lv, Boulder, CO (US); Li Shang, Shanghai (CN)

(72) Inventors: Yuhu Chang, Shanghai (CN); Yingying Zhao, Shanghai (CN); Qin Lv, Boulder, CO (US); Robert Paul Dick, Chelsea, MI (US); Li Shang, Shanghai (CN)

(73) Assignee: The Regents of the University of Michigan, Ann Arbor, MI (US)

( * ) Notice: Subject to any disclaimer, the term of this patent is extended or adjusted under 35 U.S.C. 154(b) by 327 days.

(21) Appl. No.: 18/101,856

(22) Filed: Jan. 26, 2023

(65) Prior Publication Data

US 2023/0237844 A1     Jul. 27, 2023

Related U.S. Application Data

(60) Provisional application No. 63/303,094, filed on Jan. 26, 2022.

(51) Int. Cl.
*G06V 40/16* (2022.01)
*G02B 27/00* (2006.01)
(Continued)

(52) U.S. Cl.
CPC ....... *G06V 40/176* (2022.01); *G02B 27/0093* (2013.01); *G02B 27/017* (2013.01); *G06V 20/41* (2022.01); *G02B 2027/0178* (2013.01)

(58) Field of Classification Search
None
See application file for complete search history.

(56) References Cited

U.S. PATENT DOCUMENTS

2007/0066916 A1*  3/2007  Lemos ................... A61B 3/113
                                          600/558
2014/0112556 A1   4/2014  Kalinli-Akbacak
                                  (Continued)

OTHER PUBLICATIONS

N. Sinha, M. Balazia and F. Bremond, "FLAME: Facial Landmark Heatmap Activated Multimodal Gaze Estimation," 2021 17th IEEE International Conference on Advanced Video and Signal Based Surveillance (AVSS), Washington, DC, USA, 2021, pp. 1-8, doi: 10.1109/AVSS52988.2021.9663816. (Year: 2021).*
(Continued)

*Primary Examiner* — SJ Park
*Assistant Examiner* — Caroline E. Depalma
(74) *Attorney, Agent, or Firm* — Lempia Summerfield Katz LLC

(57) ABSTRACT

A method for detecting an emotional state of a user includes obtaining a first data stream indicative of facial appearance and gaze direction of the user as the user is viewing a scene, determining, based on the first data stream, facial expression feature information indicative of emotional facial expression of the user, obtaining a second data stream indicative of visual content in a field of view of the user, determining, based on the second data stream, visual feature information indicative of visual content in the scene, determining emotional state information based on analyzing the facial expression feature information determined based on the first data stream and the visual feature information determined based on the second data stream, and performing an operation with respect to the emotional state information, wherein the emotional state information is indicative of the emotional state of the user.

20 Claims, 15 Drawing Sheets

(51) Int. Cl.
      *G02B 27/01*          (2006.01)
      *G06V 20/40*          (2022.01)

(56)                    References Cited

U.S. PATENT DOCUMENTS

2015/0067708 A1*  3/2015  Jensen ............. H04N 21/44218
                                                         725/10
2016/0350801 A1   12/2016  Vincent et al.
2016/0379225 A1*  12/2016  Rider ................. G06Q 30/0201
                                                         382/116
2017/0010647 A1*  1/2017  Frank ...................... G06F 3/015
2018/0024626 A1*  1/2018  Sanger ................. G06V 40/175
                                                         463/13
2022/0253146 A1*  8/2022  Erivantcev ............. G06F 3/016

OTHER PUBLICATIONS

International Preliminary Report on Patentability from International Patent Application No. PCT/US2023/011621, dated Aug. 8, 2024, 15 pages.

Alexandre Schaefer, Frédéric Nils, Xavier Sanchez, and Pierre Philippot. Assessing the effectiveness of a large database of emotion-eliciting films: A new tool for emotion researchers. Cognition and emotion 24, 7. 2010, pp. 1153-1172.

Arne Öhman, Anders Flykt, and Francisco Esteves. Emotion drives attention: detecting the snake in the grass. Journal of experimental psychology: general 130, 3. 2001, pp. 466-478.

Ashish Vaswani et al., Attention is All you Need. Proceedings of Conference on Neural Information Processing Systems (NIPS2017). 2017, pp. 5998-6008.

Bo-Kyeong Kim, Hwaran Lee, Jihyeon Roh, and Soo-Young Lee. Hierarchical committee of deep CNNs with exponentially-weighted decision fusion for static facial expression recognition. Proceedings of the 2015 ACM on International Conference on Multimodal Interaction. 2015. pp. 427-434.

Claudio Aracena, Sebastián Basterrech, Václav Snáel, and Juan Velásquez. Neural networks for emotion recognition based on eye tracking data. 2015 IEEE International Conference on Systems, Man, and Cybernetics. 2015. IEEE, pp. 2632-2637.

Diederik P. Kingma and Jimmy Ba. "Adam: A Method for Stochastic Optimization." Dec. 22, 2014. http://arxiv.org/abs/1412.6980; 9 pp.

Dongyu She et al., WSCNnet: Weakly supervised coupled networks for visual sentiment classification and detection. IEEE Transactions on Multimedia 22, 5. 2019, pp. 1358-1371.

Dzmitry Bahdanau, Kyunghyun Cho, and Yoshua Bengio. Neural Machine Translation by Jointly Learning to Align and Translate. Proceedings of ICLR. http://arxiv.org/abs/1409.0473. 2015; pp. 1-15.

Elena Di Lascio et al., Unobtrusive Assessment of Students' Emotional Engagement during Lectures Using Electrodermal Activity Sensors. Proc. ACM Interact. Mob. Wearable Ubiquitous Technol. 2, 3, Article 103. 2018, 21 pages.

Elena Di Lascio. Emotion-Aware Systems for Promoting Human Well-being. Proceedings of the 2018 ACM International Joint Conference and 2018 International Symposium on Pervasive and Ubiquitous Computing and Wearable Computers. 2018. pp 529-534.

Gen Li et al. Unicoder-VL: A universal encoder for vision and language by cross-modal pre-training. Proceedings of the AAAI Conference on Artificial Intelligence, 2020. vol. 34. pp. 11336-11344.

Gil Levi and Tal Hassner. Emotion recognition in the wild via convolutional neural networks and mapped binary patterns. Proceedings of the 2015 ACM on international conference on multimodal interaction. 2015. pp. 503-510.

Hadas Okon-Singer et al., Neural control of vascular reactions: impact of emotion and attention. Journal of Neuroscience 34, 12. 2014, pp. 4251-4259.

Hao Tan and Mohit Bansal. Lxmert: Learning cross-modality encoder representations from transformers. arXiv preprint arXiv:1908. 07490. 2019, pp. 1-14.

Hao Wu et al., EMO: Real-time emotion recognition from single-eye images for resource-constrained eyewear devices. Proceedings of the 18th International Conference on Mobile Systems, Applications, and Services. 2020, pp. 448-461.

He et al., "Deep Residual Learning for Image Recognition", The IEEE Conference on Computer Vision and Pattern Recognition, 2016, pp. 770-778.

Helma Torkamaan and Jürgen Ziegler. Mobile Mood Tracking: An Investigation of Concise and Adaptive Measurement Instruments. Proceedings of the ACM on Interactive, Mobile, Wearable and Ubiquitous Technologies 4, 4. 2020, pp. 1-30.

Ian J Goodfellow et al., Challenges in representation learning: A report on three machine learning contests. International conference on neural information processing. 2013. pp. 117-124.

Jana Machajdik and Allan Hanbury. Affective image classification using features inspired by psychology and art theory. Proceedings of the 18th ACM international conference on Multimedia. 2010. pp. 83-92.

Jean Costa et al., EmotionCheck: leveraging bodily signals and false feedback to regulate our emotions. Proceedings of the 2016 ACM International Joint Conference on Pervasive and Ubiquitous Computing. 2016, pp. 758-769.

Jeffrey Pennington, Richard Socher, and Christopher D Manning. GloVe: Global vectors for word representation. Proceedings of the 2014 conference on empirical methods in natural language processing (EMNLP). 2014, pp. 1532-1543.

Jiasen Lu, Dhruv Batra, Devi Parikh, and Stefan Lee. Vilbert: Pretraining task-agnostic visiolinguistic representations for vision-and-language tasks. 33rd Conference on Neural Information Processing Systems (NeurIPS 2019), 2019, pp. 1-11.

Jie Hu, Li Shen, and Gang Sun. Squeeze-and-excitation networks. Proceedings of the IEEE conference on computer vision and pattern recognition. 2018. pp. 7132-7141.

Jocelyn Scheirer, Raul Fernandez, and Rosalind W Picard. Expression glasses: a wearable device for facial expression recognition. CHI'99 Extended Abstracts on Human Factors in Computing Systems. 1999. pp. 262-263.

Jose Maria Garcia-Garcia et al., Emotion detection: a technology review. Proceedings of the XVIII international conference on human computer interaction. 2017, pp. 1-8.

Jufeng Yang, Dongyu She, Yu-Kun Lai, and Ming-Hsuan Yang. Retrieving and classifying affective images via deep metric learning. Proceedings of the AAAI Conference on Artificial Intelligence, 2018. pp. 491-498.

Jufeng Yang, Dongyu She, Yu-Kun Lai, Paul L Rosin, and Ming-Hsuan Yang. Weakly supervised coupled networks for visual sentiment analysis. Proceedings of the IEEE conference on computer vision and pattern recognition. 2018. pp. 7584-7592.

Jyoti Aneja, Aditya Deshpande, and Alexander G Schwing. Convolutional image captioning. Proceedings of the IEEE conference on computer vision and pattern recognition. 2018. pp. 5561-5570.

Katsutoshi Masai et al., AffectiveWear: towards recognizing affect in real life. Proceedings of the 2015 ACM International Joint Conference on Pervasive and Ubiquitous Computing and Proceedings of the 2015 ACM International Symposium on Wearable Computers. 2015, pp. 357-360.

Kelvin Xu et al., Show, attend and tell: Neural image caption generation with visual attention. International conference on machine learning. PMLR, 2015, pp. 2048-2057.

Kurara Fukumoto, Tsutomu Terada, and Masahiko Tsukamoto. A smile/laughter recognition mechanism for smile-based life logging. Proceedings of the 4th Augmented Human International Conference. 2013, pp. 213-220.

Lisa Aziz-Zadeh and Antonio Damasio. Embodied semantics for actions: Findings from functional brain imaging. Journal of Physiology-Paris 102, 1-3. 2008, pp. 35-39.

Luowei Zhou et al., Unified vision-language pre-training for image captioning and VQA. Proceedings of the AAAI Conference on Artificial Intelligence, vol. 34. 2020. pp. 13041-13049.

(56) References Cited

OTHER PUBLICATIONS

M. Zhang and Z. Zhou. A Review on Multi-Label Learning Algorithms. IEEE Transactions on Knowledge & Data Engineering 26, 8. 2014, pp. 1819-1837.

Maarten Coëgnarts and Peter Kravanja. Perceiving causality in character perception: A metaphorical study of causation in film. Metaphor and Symbol 31, 2, 2016, pp. 91-107.

Maja Pantic and Leon JM Rothkrantz. Toward an affect-sensitive multimodal human-computer interaction. Proc. IEEE 91, 9. 2003, pp. 1370-1390.

Marilyn Wood Daudelin. Learning from experience through reflection. Organizational dynamics 24, 3. 1996. pp. 36-48.

Mark Blum, Alex Pentland, and Gerhard Troster. Insense: Interest-based life logging. IEEE MultiMedia 13, 4; 2006, pp. 40-48.

Michele M Tugade and Barbara L Fredrickson. Resilient individuals use positive emotions to bounce back from negative emotional experiences. Journal of personality and social psychology 86, 2. 2004, pp. 320-333.

Mingmin Zhao, Fadel Adib, and Dina Katabi. Emotion recognition using wireless signals. Proceedings of the 22nd Annual International Conference on Mobile Computing and Networking. 2016. pp. 95-108.

Minh-Thang Luong, Hieu Pham, and Christopher D. Manning. "Effective approaches to attention-based neural machine translation." Proceedings of the 2015 Conference on Empirical Methods in Natural Language Processing, 2015. pp. 1412-1421.

Mintra Ruensuk, Eunyong Cheon, Hwajung Hong, and Ian Oakley. How Do You Feel Online: Exploiting Smartphone Sensors to Detect Transitory Emotions during Social Media Use. Proceedings of the ACM on Interactive, Mobile, Wearable and Ubiquitous Technologies 4, 4. 2020, pp. 1-32.

Moritz Kassner, William Patera, and Andreas Bulling; Pupil: an open source platform for pervasive eye tracking and mobile gaze-based interaction; Proceedings of the 2014 ACM international joint conference on pervasive and ubiquitous computing: Adjunct publication; 2014; pp. 1151-1160.

Niki Aifanti, Christos Papachristou, and Anastasios Delopoulos. The MUG facial expression database. 11th International Workshop on Image Analysis for Multimedia Interactive Services WIAMIS 10; 2010, pp. 1-4.

Paul Ekman. An argument for basic emotions. Cognition & emotion 6, 3-4. 1992, pp. 169-200.

Paweł Tarnowski, Marcin Kolodziej, Andrzej Majkowski, and Remigiusz Jan Rak. Eye-Tracking Analysis for Emotion Recognition. Computational Intelligence and Neuroscience. 2020, pp. 1-13.

Pengchuan Zhang et al., VinVL: Revisiting visual representations in vision-language models. Proceedings of the IEEE/CVF Conference on Computer Vision and Pattern Recognition. 2021. pp. 5579-5588.

Pingchuan Ma et al., Lip-reading with densely connected temporal convolutional networks. Proceedings of the IEEE/CVF Winter Conference on Applications of Computer Vision. 2021. pp. 2857-2866.

Rebecca J Compton. The interface between emotion and attention: A review of evidence from psychology and neuroscience. Behavioral and cognitive neuroscience reviews 2, 2, 2003, pp. 115-129.

Reinhard Pekrun, Thomas Goetz, Anne C Frenzel, Petra Barchfeld, and Raymond P Perry. Measuring emotions in students' learning and performance: The Achievement Emotions Questionnaire (AEQ). Contemporary educational psychology 36, 1. 2011, pp. 36-48.

Roddy Cowie et al., Emotion recognition in human-computer interaction. IEEE Signal processing magazine 18, 1, 2001, pp. 32-80.

Samira Ebrahimi Kahou et al., Recurrent neural networks for emotion recognition in video. Proceedings of the 2015 ACM on international conference on multimodal interaction. 2015, pp. 467-474.

Shan Li and Weihong Deng. Deep facial expression recognition: A survey. IEEE Transactions on Affective Computing. 2020, pp. 1-20.

Shan Li, Weihong Deng, and JunPing Du. Reliable crowdsourcing and deep locality-preserving learning for expression recognition in the wild. Proceedings of the IEEE conference on computer vision and pattern recognition. 2017. pp. 2852-2861.

Stephen D Christman and Michelle D Hackworth. Equivalent perceptual asymmetries for free viewing of positive and negative emotional expressions in chimeric faces. Neuropsychologia 31, 6. 1993, pp. 621-624.

Steven Hickson et al., Eyemotion: Classifying facial expressions in VR using eye-tracking cameras. 2019 IEEE Winter Conference on Applications of Computer Vision (WACV). 2019, pp. 1626-1635.

Surjya Ghosh, Bivas Mitra, and Pradipta De. Towards Improving Emotion Self-Report Collection Using Self-Reflection. 2020 CHI Conference on Human Factors in Computing Systems. 2020. pp. 1-8.

Tianrong Rao, Xiaoxu Li, Haimin Zhang, and Min Xu. Multi-level region-based convolutional neural network for image emotion classification. Neurocomputing 333. 2019, pp. 429-439.

Tim Dalgleish. The emotional brain. Nature Reviews Neuroscience 5, 7. 2004, pp. 582-589.

Victor Campos, Brendan Jou, and Xavier Giro-i Nieto. From pixels to sentiment: Fine-tuning CNNs for visual sentiment prediction. Image and Vision Computing 65; 2017, pp. 1-10.

Vincent Le Moign. Streamline Emoji, Free Icons from the Streamline Icons Pack. https://streamlineicons.com, 2017, 9 pp.

Xiaolong Wang, Ross Girshick, Abhinav Gupta, and Kaiming He. Non-local neural networks. Proceedings of CVPR. 2018. pp. 7794-7803.

Xinge Zhu et al., Dependency exploitation: A unified CNN-RNN approach for visual emotion recognition. Proceedings of the 26th international conf. on artificial intelligence. 2017. pp. 3595-3601.

Xiujun Li, et al., Oscar: Object-semantics aligned pre-training for vision-language tasks. European Conference on Computer Vision. 2020. Springer, pp. 1-16.

Yash Goyal et al., Making the V in VQA matter: Elevating the role of image understanding in visual question answering. Proceedings of the IEEE Conference on Computer Vision and Pattern Recognition. 2017, pp. 6904-6913.

Yen-Chun Chen et al., Uniter: Learning universal image-text representations. 2019, pp. 1-13, https://doi.org/10.48550/arXiv.1909.11740.

Yingying Zhao et al., A Reinforcement-Learning-Based Energy-Efficient Framework for Multi-Task Video Analytics Pipeline; IEEE Transactions on Multimedia vol. 24; 2021; 14 pp; arXiv:2104.04443.

Yuhu Chang et al., MemX: An Attention-Aware Smart Eyewear System for Personalized Moment Auto-Capture. Proc. ACM Interact. Mob. Wearable Ubiquitous Technol. 5, 2, Article 56, Jun. 2021, 23 pages. https://doi.org/10.1145/3463509.

Yujiang Wang et al., Dynamic Face Video Segmentation via Reinforcement Learning; Proceedings of the IEEE/CVF Conf. on Computer Vision and Pattern Recognition; 2020; pp. 6959-6969.

International Search Report and Written Opinion of the International Searching Authority from International Patent Application No. PCT/US2023/011621, dated Mar. 31, 2023, 15 pages.

Sinah et al., "FLAME: Facial Landmark Heatmap Activated Multimodal Gaze Estimation", 2021, 17th IEEE International Conference on Advanced Video and Signal Based Surveillance, 2021, 8 pages.

Extended European Search Report from EP Application No. 23747598.3, dated Jan. 2, 2026, 8 pages.

* cited by examiner

FIG. 14

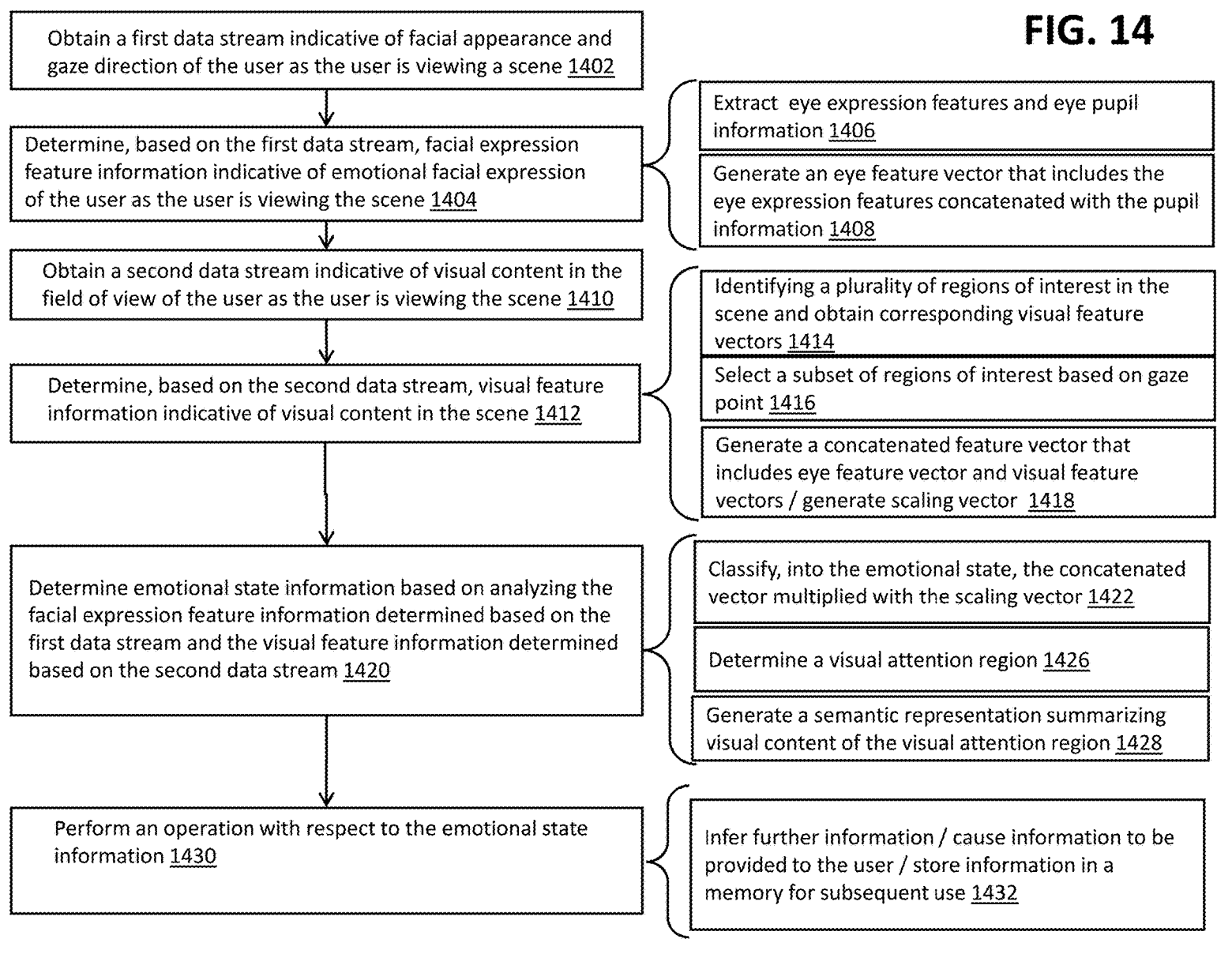

Obtain a first data stream indicative of facial appearance and gaze direction of the user as the user is viewing a scene 1402

Extract eye expression features and eye pupil information 1406

Generate an eye feature vector that includes the eye expression features concatenated with the pupil information 1408

Determine, based on the first data stream, facial expression feature information indicative of emotional facial expression of the user as the user is viewing the scene 1404

Identifying a plurality of regions of interest in the scene and obtain corresponding visual feature vectors 1414

Select a subset of regions of interest based on gaze point 1416

Generate a concatenated feature vector that includes eye feature vector and visual feature vectors / generate scaling vector 1418

Obtain a second data stream indicative of visual content in the field of view of the user as the user is viewing the scene 1410

Determine, based on the second data stream, visual feature information indicative of visual content in the scene 1412

Classify, into the emotional state, the concatenated vector multiplied with the scaling vector 1422

Determine a visual attention region 1426

Generate a semantic representation summarizing visual content of the visual attention region 1428

Determine emotional state information based on analyzing the facial expression feature information determined based on the first data stream and the visual feature information determined based on the second data stream 1420

Infer further information / cause information to be provided to the user / store information in a memory for subsequent use 1432

Perform an operation with respect to the emotional state information 1430

DETECTING EMOTIONAL STATE OF A USER BASED ON FACIAL APPEARANCE AND VISUAL PERCEPTION INFORMATION

CROSS-REFERENCE TO RELATED APPLICATION

This application claims the benefit of U.S. provisional application entitled "Emotionship Analysis for Eyewear Devices," filed Jan. 26, 2022 and assigned Ser. No. 63/303, 094, the entire disclosure of which is hereby expressly incorporated by reference.

BACKGROUND OF THE DISCLOSURE

Field of the Disclosure

The disclosure relates generally to identifying emotional state of a user based on analysis of data indicative of users' facial expression and visual content in the field of view of the user.

Brief Description of Related Technology

Research in social science and psychology indicates that a person's emotional state can considerably affect several aspects of daily life, including thoughts and behaviors, decision making, cognitive focuses, performance on assessments, physical health, and mental well-beings. Given the significant impacts of emotions, emotion recognition is one of the most crucial research topics in affective computing, and it can be applied to a wide range of human-computer interaction (HCI) scenarios to improve user experience. Intelligent eyewear systems are especially well suited to carry out and benefit from emotion recognition.

A common goal of smart eyewear devices is to deliver intelligent services with personalized experiences. This requires understanding the users, especially their affective status. The ability to recognize emotion can greatly enhance user experience in various HCI scenarios. Further, an emotion-sensitive wearable front-end would enable a variety of personalized back-end applications, such as emotional self-reflection, emotional life-logging, emotional retrieving and classification, and mood tracking.

Recognizing emotions using smart eyewear devices is challenging. The majority of state-of-the-art emotion recognition techniques use deep learning to classify expressions from full facial images. However, it is typically difficult to capture the entire face using sensors that can economically be integrated into current eyewear devices. This mismatch between economical sensors and analysis techniques hinders the practical application of existing emotion recognition methods in eyewear.

To address this challenging problem, conventional systems have adopted engineering-based approaches to extract hand-crafted features from eye regions instead of the whole facial images to compute the affective status. With the embedding of eye-tracking cameras in commercial eyewear devices, recent eyewear systems developed convolutional neural networks (CNN) to extract deep affective features from eye-camera-captured images (typically eye regions) for head-mounted virtual reality (VR) glasses and smart glasses. However, such conventional systems have limited recognition accuracy because the typically predict human emotions based entirely on the portions of facial expressions visible near the eyes, ignoring the subtle yet crucial associations between emotional status and visual perception.

SUMMARY OF THE DISCLOSURE

In accordance with one aspect of the disclosure, a method for detecting an emotional state of a user includes obtaining, by a processor, a first data stream indicative of facial appearance and gaze direction of the user as the user is viewing a scene, determining, by the processor based on the first data stream, facial expression feature information indicative of emotional facial expression of the user as the user is viewing the scene, obtaining, by the processor, a second data stream indicative of visual content in a field of view of the user as the user is viewing the scene, determining, by the processor based on the second data stream, visual feature information indicative of visual content in the scene, determining, by the processor, emotional state information based on analyzing the facial expression feature information determined based on the first data stream and the visual feature information determined based on the second data stream, and performing, by the processor, an operation with respect to the emotional state information, wherein the emotional state information is indicative of the emotional state of the user.

In accordance with another aspect of the disclosure, a method for detecting an emotional state of a user including obtaining, by a processor, a first data stream indicative of facial appearance and gaze direction of the user as the user is viewing a scene, determining, by the processor based on the first data stream, facial expression feature information indicative of emotional facial expression of the user as the user is viewing the scene, obtaining, by the processor, a second data stream indicative of visual content in a field of view of the user as the user is viewing the scene, determining, by the processor based on the second data stream, visual feature information indicative of the visual content in the scene, determining, by the processor, emotional state information based on analyzing the facial expression feature information determined based on the first data stream and the visual feature information determined based on the second data stream, wherein the emotional state information i) is indicative of the emotional state of the user and ii) includes a semantic representation of the visual content in the scene, wherein the semantic representation indicates a cause for the emotion state of the user, and performing, by the processor, an operation with respect to the emotional state information.

In accordance with yet another aspect of the disclosure, a system comprises a first sensor configured to generate a first data stream indicative of facial appearance and gaze direction of a user as the user is viewing a scene, a second sensor configured to generate a second data stream indicative of visual content in a field of view of the user as the user is viewing the scene, and an emotion analysis engine implemented on one or more integrated circuits, the emotion analysis engine configured to obtain the first data stream from the first sensor, determine, based on the first data stream, facial expression feature information indicative of emotional facial expression of the user as the user is viewing the scene, obtain the second data stream from the second sensor, determine, based on the second data stream, visual feature information indicative of the visual content in the scene, determine emotional state information based on analyzing the facial expression feature information determined based on the first data stream and the visual feature information determined based on the second data stream, wherein the emotional state information is indicative of an emotional state of the user, and perform an operation with respect to the emotional state information.

In connection with any one of the aforementioned aspects, the devices and/or methods described herein may alternatively or additionally include or involve any combination of one or more of the following aspects or features. Performing the operation with respect to the emotional state information comprises performing one or more of i) inferring, by the processor, further information from the emotional state information, ii) causing, by the processor, one or both of the emotional state information and the further information inferred from the emotional state information to be provided to the user, or iii) storing, by the processor in a memory, one or both of the emotional state information and the further information inferred from the emotional state information for subsequent use. Determining the emotional state information includes determining, based on the second data stream, semantic information corresponding to the visual content in the scene, identifying, based on the visual feature information indicative of the visual content in the scene and the semantic information corresponding to the visual content in the scene, a visual attention region of interest in the scene, and generating a semantic representation summarizing the visual content in the visual attention region of interest in the scene, wherein the semantic representation indicates a cause for the emotional state of the user. Obtaining the first data stream comprises obtaining one or more images depicting an eye region of a face of the user. Determining the facial expression feature information includes extracting eye expression features and eye pupil information from the one or more images depicting the eye region of the face of the user, and generating an eye feature vector that includes the eye expression features concatenated with the eye pupil information. The method further includes, prior to obtaining the second data stream, detecting, by the processor based on the eye feature vector, a non-neutral emotional state of the user, and in response to detecting the non-neutral emotional state of the user, triggering, by the processor, capture of the second data stream to capture the visual content in the field of view of the user. Detecting the non-neutral emotional state of the user comprises classifying the eye feature vector into one of a neutral emotional state of the user and the non-neutral emotional state of the user. Determining the visual feature information based on the second data stream includes identifying, based the second data stream, a plurality of regions of interest in the scene, obtaining respective visual feature vectors corresponding to the plurality of regions of interest in the scene, and selecting a predetermined number of regions of interest that are closest to a gaze point of the user, wherein the gaze point of the user is determined based on the first data stream. Determining the emotional state information includes generating a concatenated feature vector including the eye feature vector concatenated with the respective visual feature vectors corresponding to the predetermined number of regions of interest that are closest to the gaze point of the user, determining, based the concatenated feature vector, a scaling vector comprising importance scalars for respective features of the concatenated feature vector, generating a weighted concatenated feature vector by channel-wise multiplication between the scaling vector and the concatenated feature vector, and classifying the weighted concatenated feature vector into an emotional state classes among a plurality of predetermined emotional state classes. Determining the emotional state information further includes determining, based on the second data stream, respective semantic feature vectors corresponding to the regions of interest that are closest to the gaze point of the user, identifying, based on the respective visual feature vectors and the respective semantic feature vectors corresponding to the regions of interest that are closest to the gaze point of the user, a visual attention region of interest that evokes the emotional state of the user, and generating, based on a visual feature vector corresponding to the visual attention region of interest in the scene, a semantic representation summarizing the visual content in the visual attention region of interest in the scene, wherein the semantic representation indicates a cause for the emotional state of the user. Determining the emotional state information further includes determining, based on the scaling vector, an influence score indicating a degree of emotional impact of the visual content on the user, and wherein generating the semantic representation comprises generating the semantic representation when the degree of emotional impact exceeds a predetermined threshold. The system of claim 15, wherein emotion analysis engine is configured to perform the operation with respect to the emotional state information at least by performing one or more of i) inferring further information from the emotional state information, ii) causing one or both of the emotional state information and the information further inferred from the emotional state information to be provided to the user, or iii) storing, in a memory, one or both of the emotional state information and the further information inferred from the emotional state information for subsequent use. The emotion analysis engine is configured to apply a vision-language neural network to the second data stream to obtain semantic information corresponding to the visual content in the scene, identify, based on the visual feature information indicative of the visual content in the scene and the semantic information corresponding to the visual content in the scene, a visual attention region of interest in the scene, and apply a vision-language fusion neural network to data, in the second data stream, corresponding to the visual attention region of interest in the scene to obtain a semantic representation summarizing the visual content in the visual attention region of interest in the scene. The first data stream comprises one or more images depicting an eye region of a face of the user, and the emotion analysis engine is configured to extract eye expression features and eye pupil information from the one or more images depicting the eye region of the face of the user, and generate an eye feature vector that includes the eye expression features concatenated with the eye pupil information. The emotion analysis engine is configured to, prior to obtaining the second data stream, detect, based on the eye feature vector, a non-neutral emotional state of the user, and in response to detecting the non-neutral emotional state of the user, trigger capture of the second data stream to capture the visual content in the field of view of the user. The emotion analysis engine is configured to apply a visual-language neural network to the second data stream to identify a plurality of regions of interest in the scene and obtain respective visual feature vectors corresponding to the plurality of regions of interest in the scene, determine a gaze point of the user based on the first data stream, select a predetermined number of regions of interest that are closest to the gaze point of the user, generate a concatenated feature vector including the eye feature vector concatenated with the respective visual feature vectors corresponding to the regions of interest that are closest to a gaze point of the user, determine, based the concatenated feature vector, a scaling vector comprising importance scalars for respective features of the concatenated feature vector, generate an importance weighted vector by channel-wise multiplication between the scaling vector and the concatenated feature vector, and classify the concatenated feature vector into an emotional state class among a plurality of predetermined emotional state classes.

BRIEF DESCRIPTION OF THE DRAWING FIGURES

For a more complete understanding of the disclosure, reference should be made to the following detailed description and accompanying drawing figures, in which like reference numerals identify like elements in the figures.

Figures 3A, 3B:
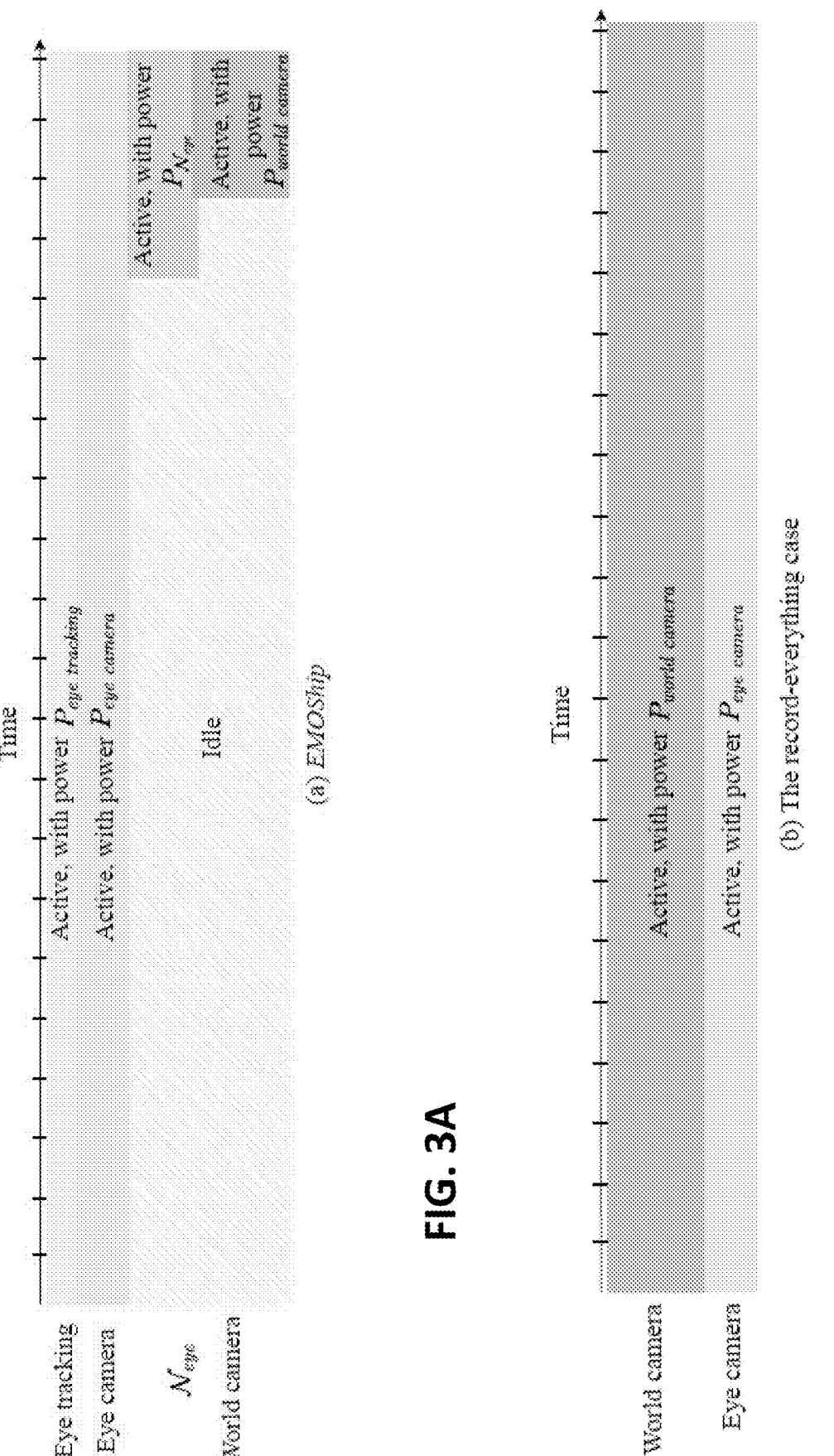

FIGS. 3A-B illustrate runtime operation of an emotion identification in accordance with examples.

Figures 4A, 4B:
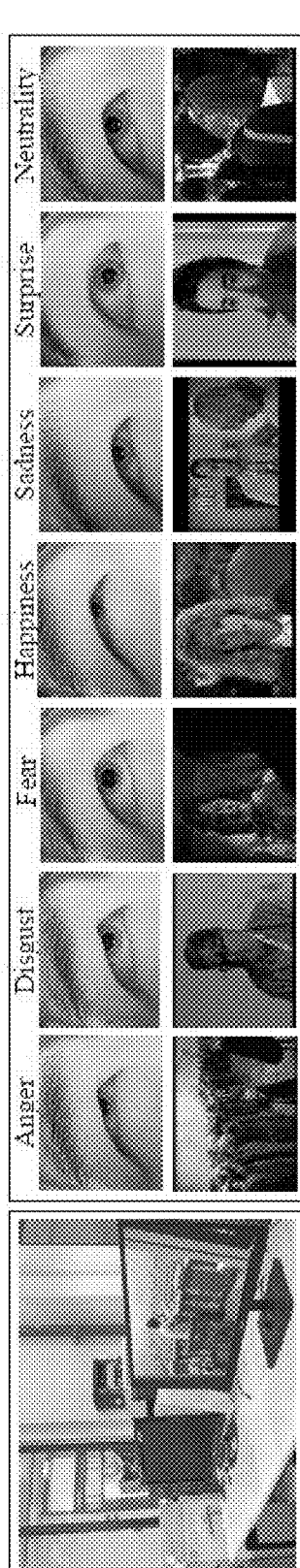

FIGS. 4A-B illustrate a data collection method in accordance with an example.

Figure 5:
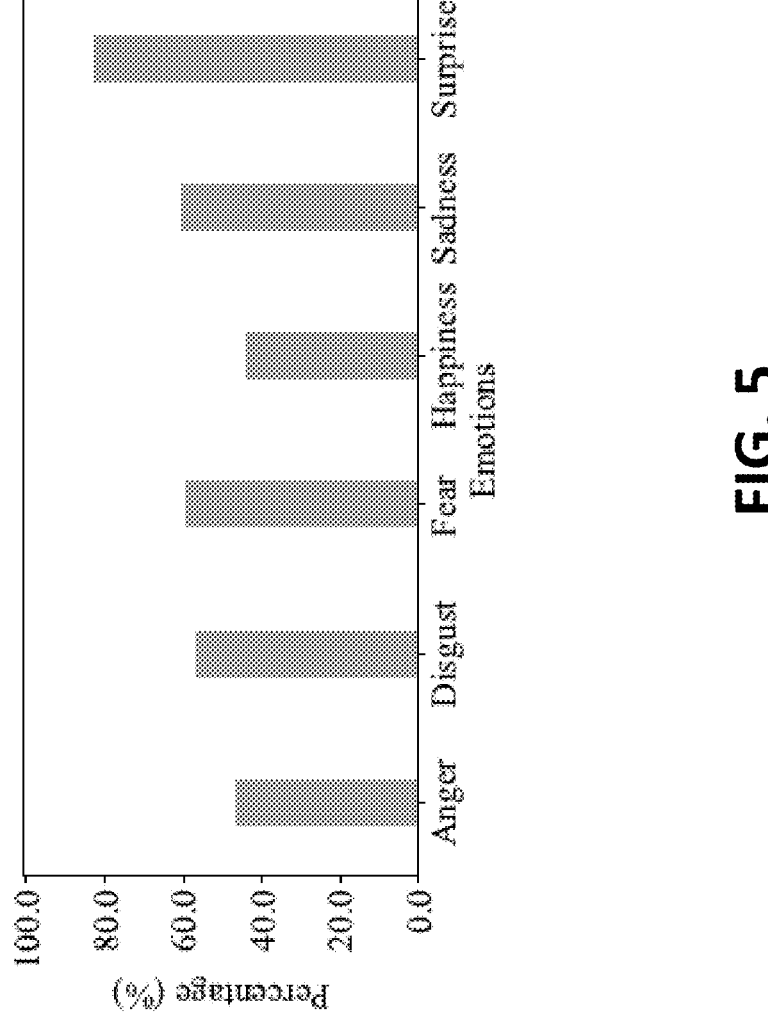

FIG. 5 is a bar chart illustration of percentage of video frames where subjects demonstrate the same emotional reactions for different emotional classes in accordance with an example.

Figure 6:
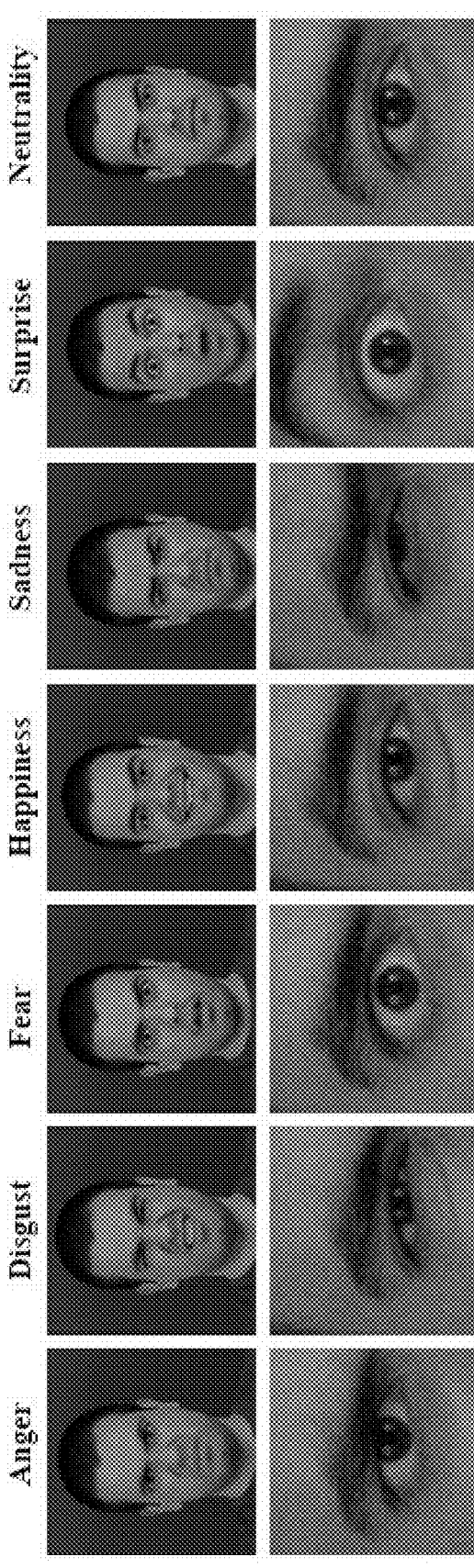

FIG. 6 depicts emotional expressions of facial expression examples and fine-tuning single-eye-area cropped data cropped in accordance with an example.

Figures 7A, 7B, 7C:
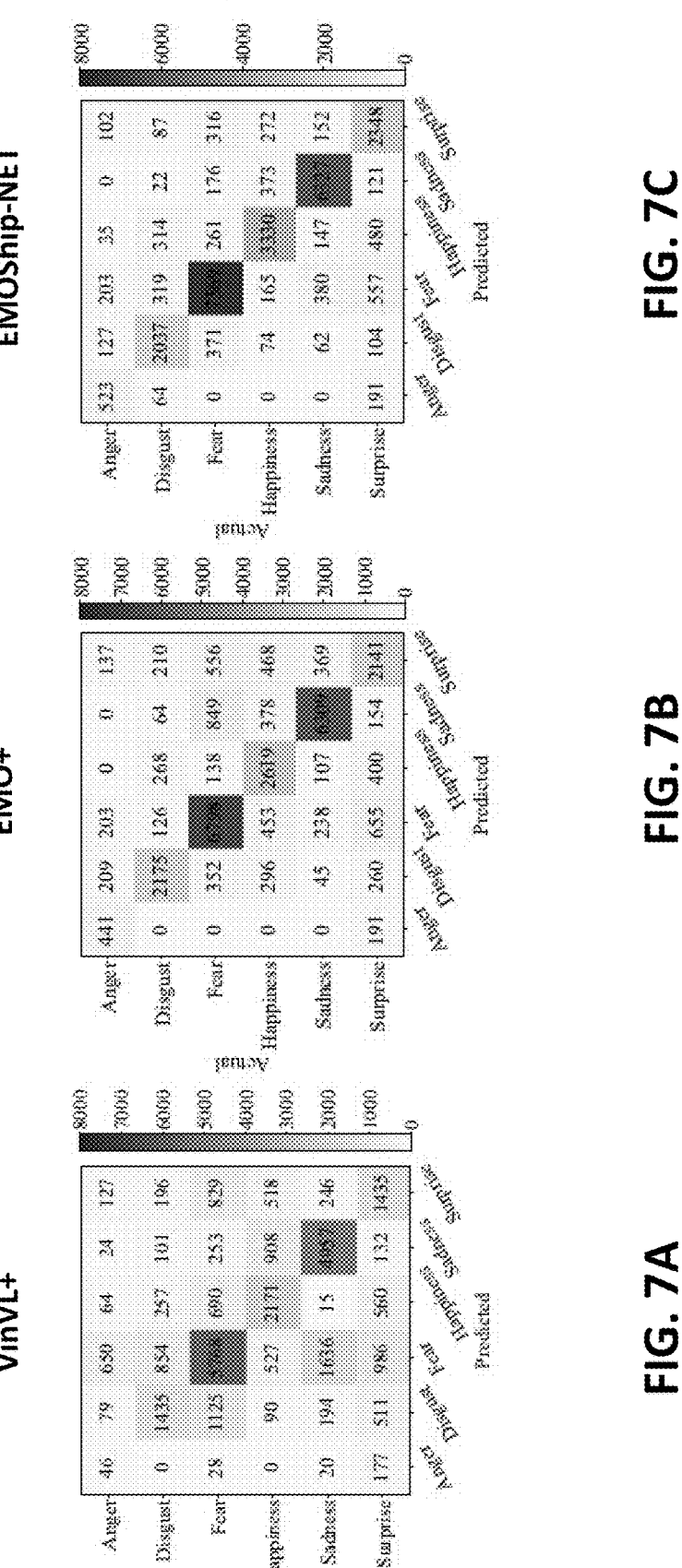

FIG. 7A-C illustrate confusion matrices of individual emotional moments when using baseline methods and a method in accordance with an example.

Figure 8:

FIG. 8 depicts an emotion recognition comparison between two baseline methods and a method in accordance with an example.

Figures 9A, 9B:
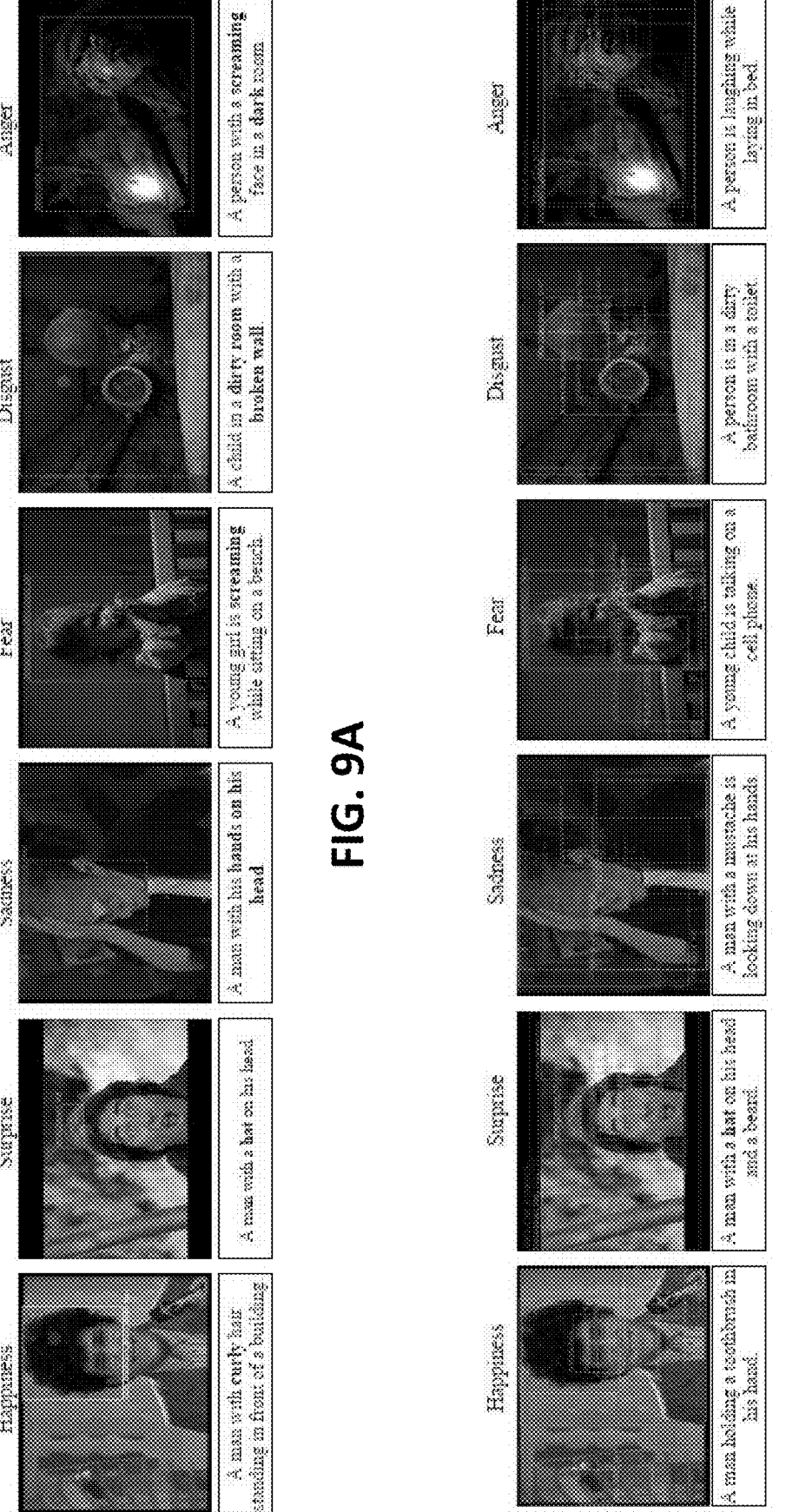

FIGS. 9A and 9B show examples of semantic summary tags generated by the disclosed system and a baseline system, respectively.

Figure 10:
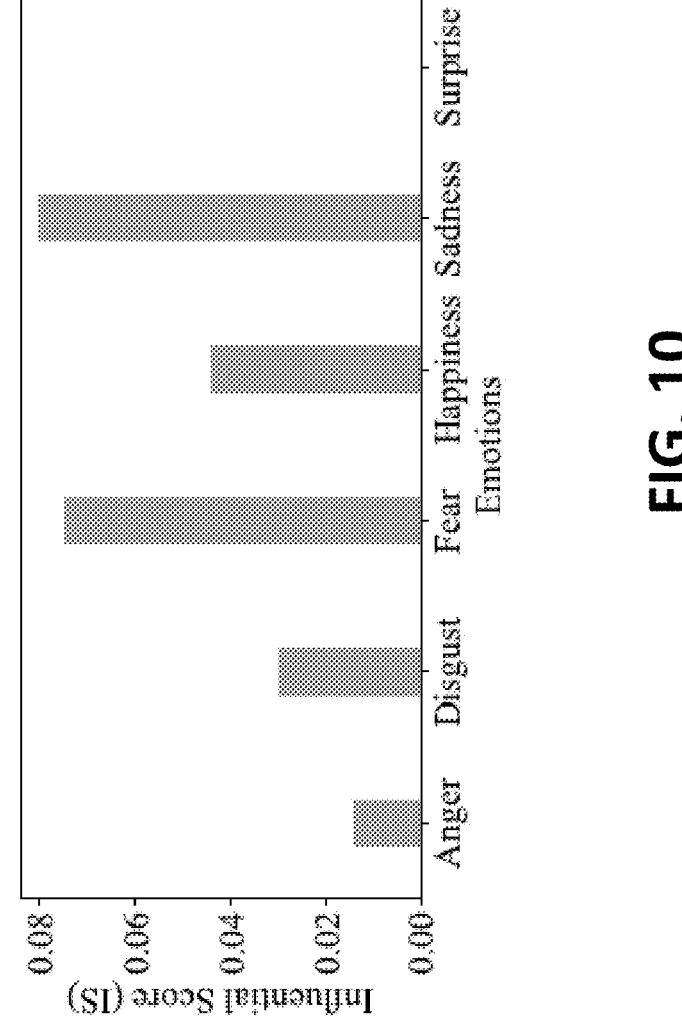

FIG. 10 depicts degree of emotional impacts from visual perceptions in accordance with an example.

Figure 11:
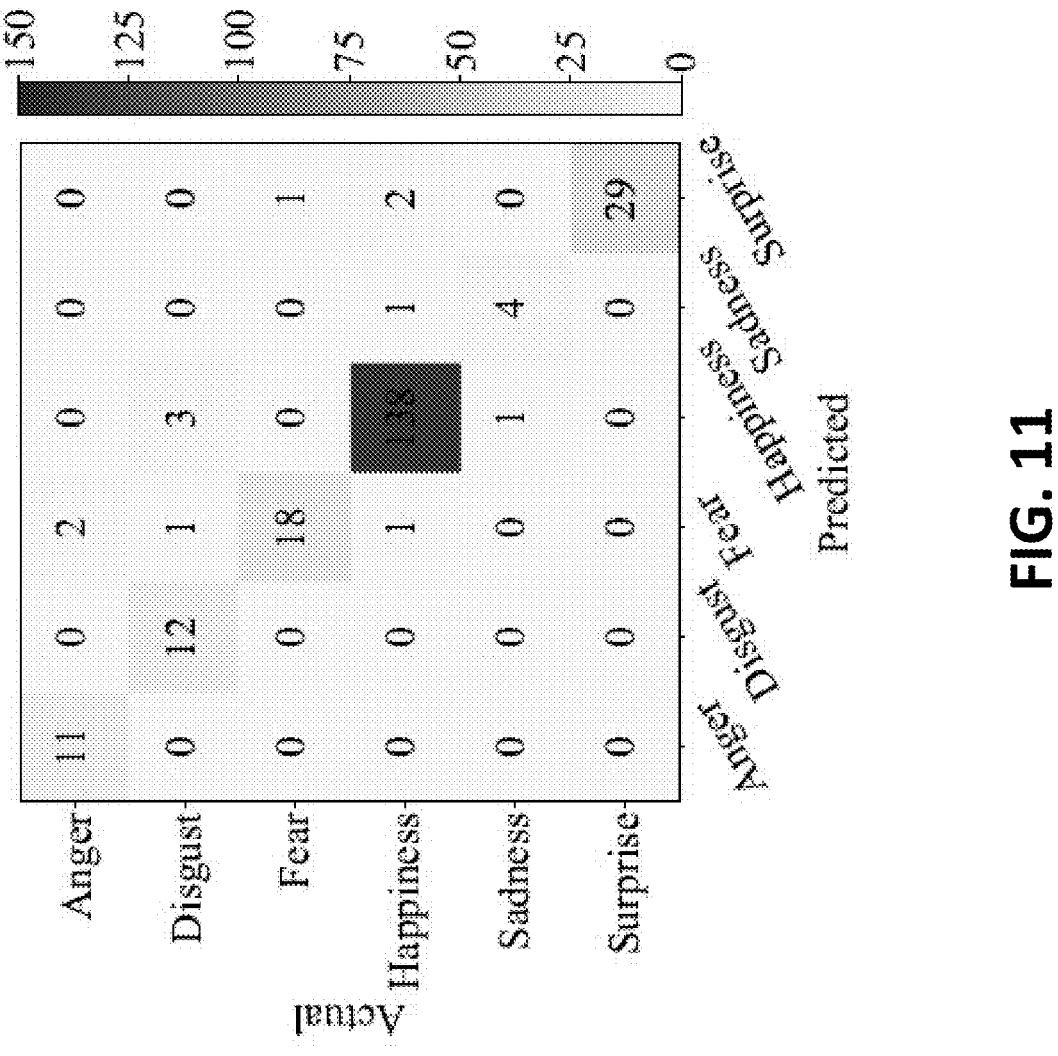

FIG. 11 depicts a confusion matrix of individual emotional moments when using an emotion recognitions system, in accordance with an example, in pilot studies.

Figure 12:
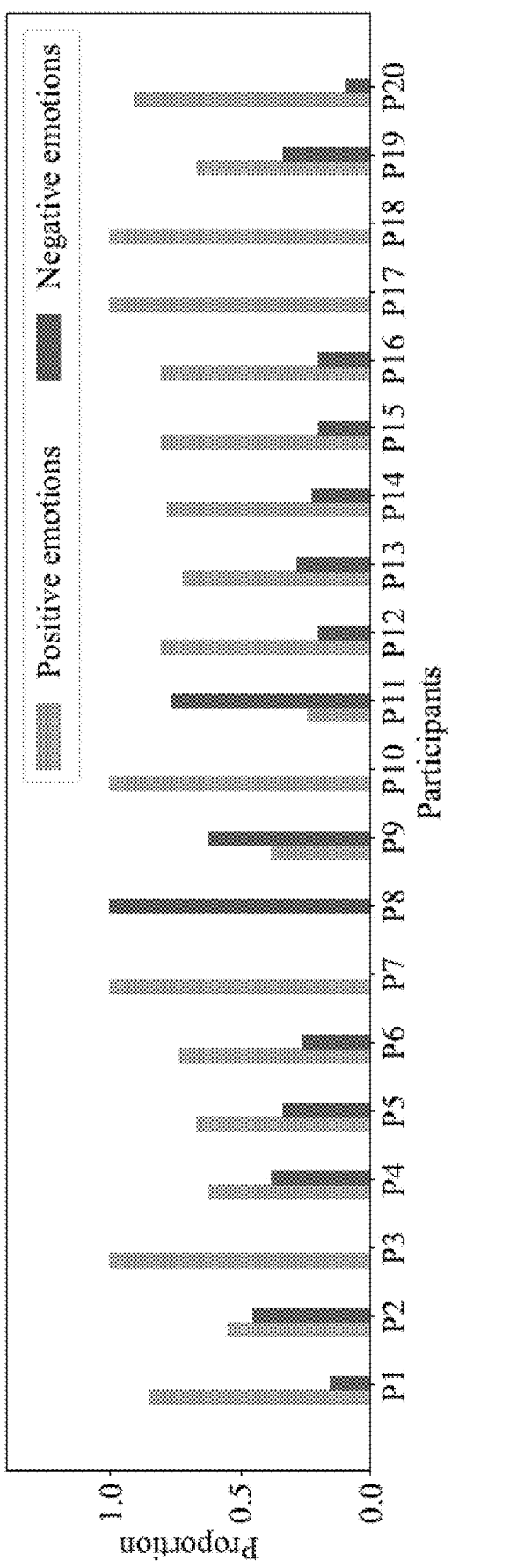

FIG. 12 is a bar chart illustration of a profile of emotional states for participants in a pilot study.

Figure 13:
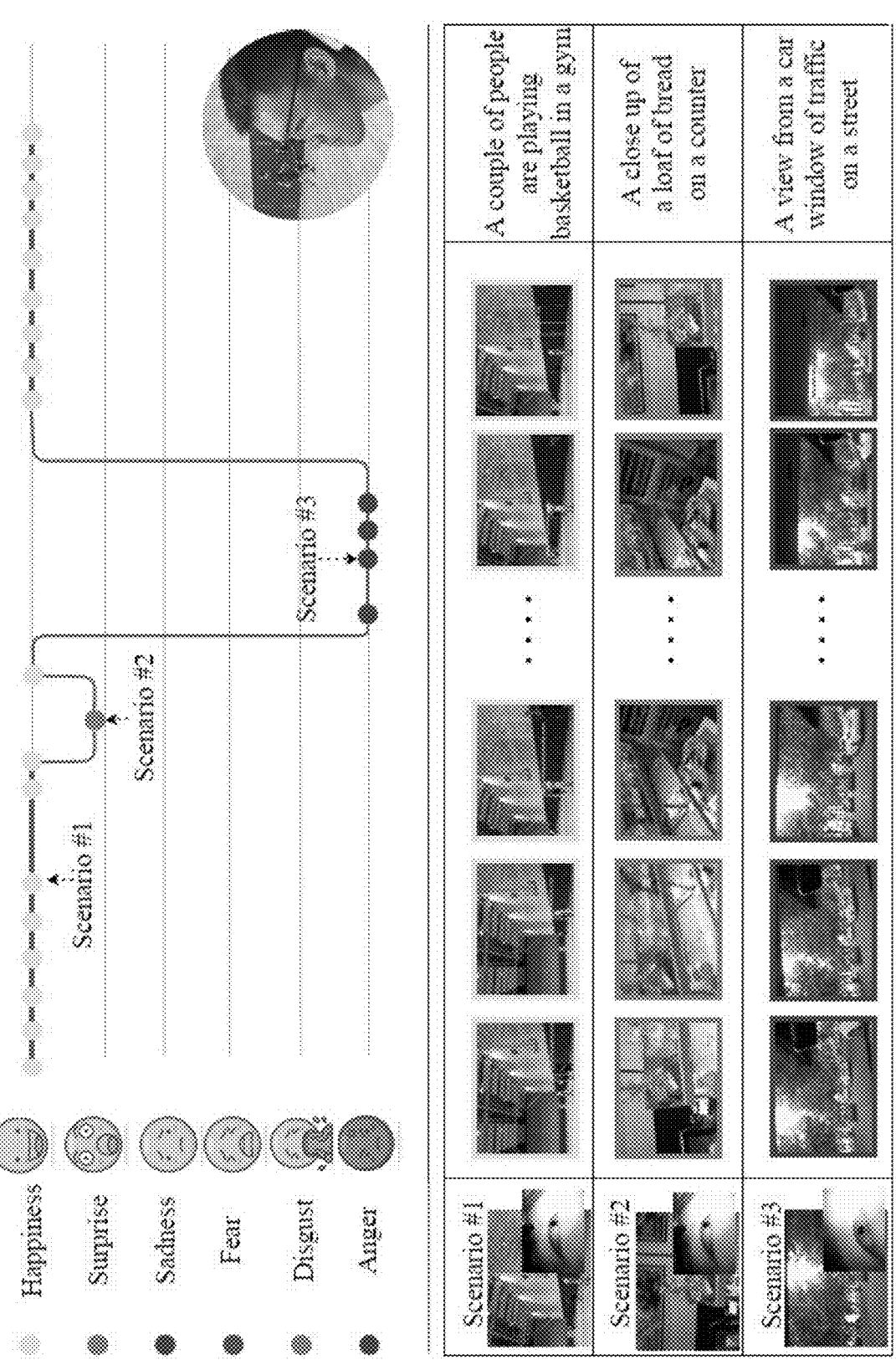

FIG. 13 depicts time series emotional states for a participant in a pilot study.

FIG. 14 depicts a method for emotion recognition in accordance with an example.

Figure 15:
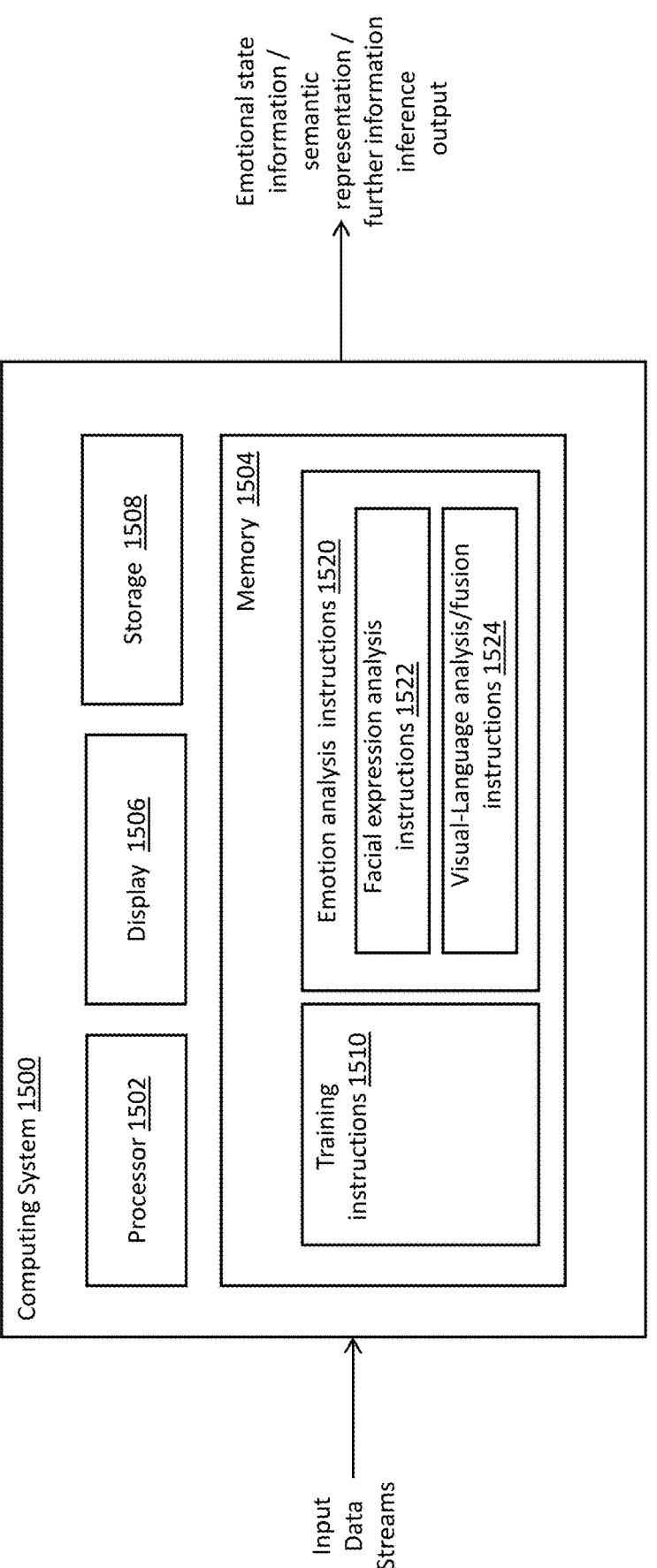

FIG. 15 is a block diagram of a computing system with which aspects of the disclosure may be practiced.

The aspects of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems and methods are provided that perform emotion recognition based on both i) identifying emotional status of a user and ii) exploring associations between the emotional status and visual perception of the user. As discussed above, conventional emotion recognition systems generally rely on facial expression near eyes of a user to recognize emotional state of the user. Aspects of the present disclosure, on the other hand, rely on the emotional state that can be found in expressions and also visual experiences of the user. In various examples, the additional sentimental clues provided by visual experience improve emotion recognition compared to considering facial expressions alone. As shown in studies of behaviors and neuroscience, sentimental content in scenes is generally prioritized by people's visual attention compared to emotionally neutral content. Such emotion-arousing content is sometimes referred to emotional stimuli. For example, viewing a child playing with parents can lead to joyfulness, while a crying woman who just lost her husband can lead to sadness. In other words, emotion is not an isolated property; instead, it is tightly connected with visual emotional stimuli. Emotions can be closely associated with varying sentimental visual perception, especially for eyewear devices with rapidly altering scenes.

Based on the above observations, disclosed systems and methods may utilize image or other data obtained from sensors (e.g., cameras) that may be installed, for example, in smart eyewear devices to detect user's emotional status and also analyze associations of the emotional state with semantic-level visual perception of the user. Through emotionship analysis, the disclosed methods and systems may recognize emotions of the user with better accuracy as compared to, for example, systems that utilize only analysis of facial expressions for emotion detections, and may further determine the semantic causes for the emotions. As used herein, the term emotionship denotes the association of emotional status with the relevant hints in expression and visual attention. In various examples, quantitative measurement of visual attention is used to better estimate emotional state. In at least some examples, an emotion categorization system that classifies emotions into six basic classes or categories plus neutrality is used to define the status of emotions. In at least some examples, a semantic-level understanding of visual experiences is used because a certain attention region may consist of multiple objects, which may render the associations among emotions and objects ambiguous. Thus, the disclosed systems and methods may capture the semantic attributes of visual perceptions. Emotionship analysis disclosed herein may utilize semantic analysis of the human visual perception, its association with the emotional status, etc. As compared to conventional emotional techniques, emotionship analysis framework disclosed herein may lead to a personalized eyewear system that is capable of performing unseen and valuable emotion-aware downstream tasks, in at least some examples.

In various examples, emotionship analysis in eyewear devices may be performed using a deep neural network that predicts semantic attributes from scene images and can synthesize emotional clues from both eye and scene images and is aware of each feature's importance. The disclosed systems and method may be thus be used, for example, to provide an intelligent eyewear system capable of emotionship analysis. In other aspects, the disclosed systems and methods may be used to provide valuable emotional analysis in other suitable scenarios.

In various examples, the disclosed systems and methods measure the relationship between the semantic attributes of visual attention and the emotional state of the wearer. Using this learned relationship increases the accuracy of emotional state recognition, in at least some examples.

In various examples, disclosed smart eyewear may be equipped with a deep neural network that extracts expression-related affective features and sentimental clues in visual attention, fusing them to more accurately recognition emotion and quantify emotionship associations.

In an example, a dataset may be collected and constructed and may be used to evaluate accuracy and usefulness of the disclosed systems and methods. As described in more detail below, with the availability of visual perceptions' semantic attributes, the emotional states, and the emotional impacts of visual attentions, the disclosed systems and methods outperform baseline methods on an example collected dataset (sometimes referred to herein as "EMO-Film" dataset) in terms of emotion recognition accuracy, in at least some aspects. In an example, with the collected EMO-Film dataset, the disclosed systems and methods achieved approximately 10.8% higher emotion recognition accuracy than several baseline methods. The collected dataset demonstrates the usefulness of the disclosed systems and methods in providing valuable sentimental clues for emotionship understanding. In aspects, the disclosed systems and methods provide a semantic understanding of potential causes of emotions.

In-field pilot studies have been conducted to illustrate the capabilities of the disclosed systems and methods and demonstrate its potential applications to a number of emotionship-relevant tasks such as emotionship self-reflection and emotionship life-logging. For example, in an example three-week study of 20 participants, described in more detail below, the disclosed systems and methods captured emotional moments with a precision of 82.8%. A survey-based study showed that 16 out of 20 users found emotionship self-reflection beneficial, while 15 out of 20 users found emotion life-logging beneficial.

The disclosed systems and methods are suitable for use in wearable and/or other battery-powered and/or embedded systems, but not limited thereto. Although the disclosed systems and methods are generally described as being implemented locally in a wearable device, such as a camera system integrated with eyewear, any one or more aspects of the data processing described herein may be implemented remotely, for example at a remote server. The number, location, arrangement, configuration, and other characteristics of the processor(s) of the disclosed systems, or the processor(s) used to implement the disclosed methods, may vary accordingly.

Figure 1:
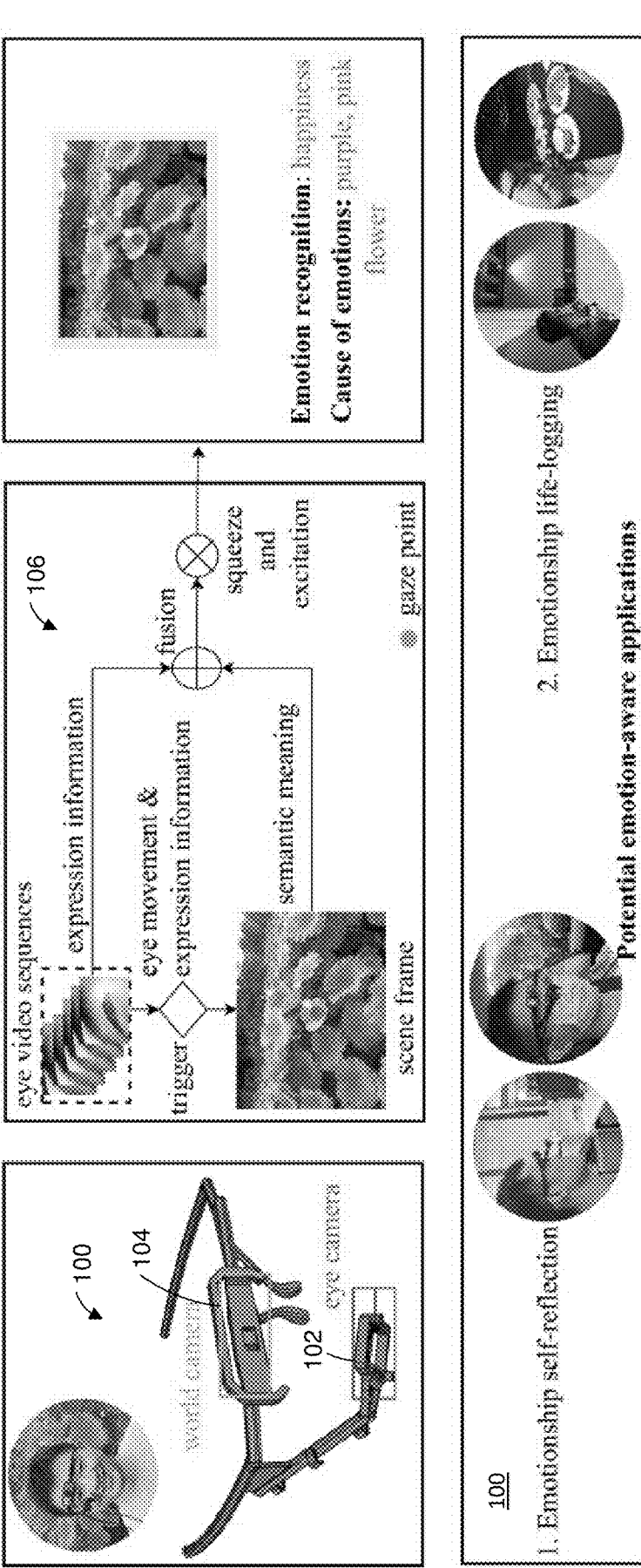
FIG. 1 is a block diagram of an example emotion identification system configured to identify a user's emotional state in accordance with an example.

FIG. 1 illustrates an emotionship-aware eyewear system 100, sometimes referred herein as "EMOShip" system. The system 100 includes a first sensor 102 and a second sensor 104. The first sensor 102 and/or the second sensor 104 may comprises a single sensor or may comprise multiple sensors, such as multiple sensors of different types. The first sensor 102 may be configured to capture information indicative of movement, gaze direction and expression of one or both eyes of the user. In various examples, the first sensor 102 may comprise one or more of i) a camera, such as a visible light camera, an infrared camera, etc. that may be configured to capture images or videos depicting one or both eyes of the user, ii) an infrared sensor configured to capture eye movement, eye gaze direction and/or eye or facial expression information based on active IR illumination of one or both eyes of the user, iii) a camera configured to passively capture appearance of or one or both eyes of the user, etc. In some examples, the first sensor 102 may comprise one or more wearable position and/or orientation sensor devices, such as an accelerometer, a gyroscope, a magnetometer, etc., that may be attached to the user (e.g., user's head, user's body, etc.), or to a wearable device (e.g., eyewear) that may be worn by the user, and may be configured to detect position and/or orientation of the user (e.g., user's head and/or body)

relative to the scene being viewed by the user. In an example, the orientation and/or position of the user relative to the scene being viewed by the user may be indicative of the eye movement and/or gaze direction of the user relative to the scene. In other examples, the first sensor 102 may additionally or alternatively comprise other suitable sensor devices that may be configured to capture or otherwise generate information indicative of eye movement, eye gaze direction and/or eye or facial expression of the user.

The second sensor 104 may be a visual scene sensor that may be configured to capture image data, video data, etc. capturing the scene in the field of view of the user. In various examples, the second sensor 104 may comprise one or more of i) a camera, such as a visible light camera, an infrared camera, etc., ii) a camcorder, iii) a video recorder, etc. In other examples, the second sensor 104 may additionally or alternatively comprise other suitable sensor devices that may be configured to capture or otherwise generate data, such as image or video data, indicative of visual content in the field of view of the user.

In an example, the first sensor 102 and the second sensor 104 are mounted on eyewear, such as glasses or goggles, that may be worn by the user, with the first sensor 102 (sometimes referred to herein as "eye camera") configured as an inward-facing sensor, e.g., facing the eyes of the user, and the second sensor 104 (sometimes referred to herein as "world camera") configured as a forward-facing sensor with respect to field of view of the user. In other examples, instead of being attached to a user or to a device worn by the user, the first sensor 102 and/or the second sensor 104 may be located at a suitable distance from the user. For example, the first sensor 102 and/or the second sensor 104 may be a distance sensor (e.g., distance camera) positioned in the vicinity of the user. As just an example, the first sensor 102 may be a web camera, or webcam, that may generally be facing the user as the user is viewing the scene.

In an example, the second sensor 104 is configured to capture images (e.g., video) or other data indicative of a scene being viewed by the user, whereas the first sensor 102 is configured to concurrently capture images or other data indicative of the user's eye movement, eye gaze and/or eye or facial expression of the user as the user is viewing the scene. The system 100 may include an emotion analysis engine 120 (sometimes referred to herein as "EMOShip-Net") that may be configured to determine an emotional state of the user based on i) semantic attributes of the visual attentive regions in the field of view of the user (e.g., extracted from images and/or other information obtained by the sensor 104) and ii) expression-related information indicative of eye or facial expression of the user (e.g., extracted from images and/or other information obtained by the sensor 102). In an example, to extract and summarize the semantic attributes of visual perceptions, the emotion analysis engine 120 may utilize i) gaze points from eye-tracking and i) a vision language and vision-language fusion engine. The emotion analysis engine 120 may synthesize sentimental clues in visual perceptions with the expression-related information in eye images to predict emotional status more accurately and robustly. The contributions of visual perception to emotional states, which may be subtle and challenging to measure, may be quantitatively evaluated by a neural network, such as a Squeeze-and-Excitation (SE) network, that may fuse the scene and eye features.

The emotion analysis engine 120 may be implemented on or by a processor, such as one or more of a central processing unit (CPU), a graphical processing unit (GPU), a microcontroller, digital signal processor (DSP), a machine learning accelerator, etc. The processor implementing the emotion analysis engine 120 may be any suitable processor that may be implemented on one or more integrated circuits, such as application specific integrated circuit (ASIC), field programmable gate arrays (FPGA), etc. The emotion analysis engine 120 may include one or more neural networks, such as one or more deep neural networks, trained or otherwise configured to analyze the facial expressions and visual content to detect an emotional state of a user and identify and summarize visual content that is the cause of the emotional state of the user.

In various aspects, the emotion analysis engine 120 may categorize emotions according to a suitable emotion categorization system. For example, the emotion analysis engine 120 may utilize an emotion categorization system that divides emotions into six basic classes or categories: happiness, sadness, fear, anger, disgust, and surprise. Neutrality may be an additional, seventh, state: the absence of emotion. The seven basic emotions may thus be utilized as an emotion categorization system, in at least some examples.

In various aspects of the present disclosure, emotion recognition is performed using emotionship analysis based on users' eye and/or facial expressions and their visual perceptions. Various techniques for obtaining information indicative of users' eye and/or facial expressions. In some cases, emotion classifiers, such as deep neural networks, are utilized to classify emotions from whole-face images, as facial expressions are one of the most common channels for humans to express emotions. In other aspects, eye-region images may be utilized. In some examples (e.g., in eyewear devices), such eye-region images may be more easily captured as compared to capturing whole-face images. For example, such eye-region images may be captured using commodity eye cameras. Further, such eye-region images have been shown to contain sufficient expression-related information as part of emotion estimation. In various aspects, image analysis techniques may be utilized to analyze eye-region images for emotion recognition in eyewear systems. In some examples, eye-tracking information, such as information regarding eye movements and pupil diameters, may be utilized as part of emotion recognition. For example, pupil size and/or gaze position information may be utilized. In some cases, a deep-learning-based network that extracts emotional features from single-eye images and uses them to classify emotional state may be used.

In addition to information indicative of users' eye and/or facial expressions, visual sentiment analysis may be performed to predict the emotional states produced by images.

In an example, the sentimental features in scene images are extracted for image-based computer vision emotion estimation using suitable Vision-Language (VL) methods and techniques. The VL methods and techniques may consist of two stages: i) object detection may be used to predict the Regions of Interest (RoIs) of each object and also to extract the feature embedding for each RoI and ii) cross-modal fusion may be used to generate short descriptions of each RoI's semantic attributes. As a result, in an example, a VL engine may generate all RoIs in a scene image, the feature embedding for each RoI, and also the semantic attributes of each RoI. In an aspect, an improved-performance (e.g., VinVL) engine is used to extract visual presentations at higher qualities, and a vision language fusion engine, such as a transformer-based Object-Semantics Aligned Pre-training (OSCAR) engine may be used to perform the cross-modal semantic attributes predictions. In some examples, an improved (e.g., OSCAR+) that utilizes VinVL features and is trained on multiple datasets, resulting in a significantly improved performance of the OSCAR on a variety of downstream Natural Language Processing (NLP) tasks, may be utilized. In an example, visual perception extraction and semantic attribute prediction may be performed using a suitable vision-language and vision language fusion engine, e.g., using methods and techniques of Zhang et al., "Vinyl: Revisiting visual representations in vision-language models," Proceedings of the IEEE/CVF Conference on Computer Vision and Pattern Recognition 5579-5588 (2021), the entire disclosure of which is hereby incorporated by reference. The VinVL methods and techniques have achieved state-of-the-art performance in VL tasks, and the performance of OSCAR+ has also surpassed that of others on downstream NLP tasks.

In an aspect of the present disclosure, a VL engine and a natural language processing (NLP) engine are integrated into the disclosed eyewear system, making the system aware of semantic attributes. For example, VinVL and OSCAR+ engines are utilized to meet the requirements of semantic understanding in emotionship analysis. There are several benefits of using a VL engine, such as VinVL, and an NPL engine, such as OSCAR+, in emotionship analysis. One advantage is that the semantic attributes of RoIs can be predicted, which can enable emotionship awareness. Another advantage is that the semantic features of RoIs are also provided in VinVL. These features encode sufficient sentimental clues for fusion with eye-expression-related information to achieve more accurate emotion prediction. Further, language analysis tasks such as Question Answering (QA) can be performed through using an NPL engine, such as OSCAR+, which allows the disclosed system to generate a representation, such as a semantic representation (e.g., a textual representation or a summary tag), of a visual region in the scene viewed by the user.

In other examples, other visual sentiment analysis may be employed. For example, visual sentiment analysis based on approaches that divide the intended emotions from images into a plurality of classes or categories, such as six classes or categories, seven classes or categories, or another suitable number of classes or categories, may be used. In some examples, sentiment prediction used hand-crafted features to recognize intended emotions may be used. Such features may include color variance, composition, and image semantics, for example. In some aspects, deep convolutional neural network (CNN) learning based sentiment prediction to extract deep features for sentiment prediction may be employed. In an example, a unified CNN-RNN engine to predict image emotions based on both low-level and high-level features is used. Such unified CNN-RNN engine may be configured to consider dependencies of the features. In other examples, image emotions may be classified based on a multi-level deep neural network that combines local emotional information from emotional regions with global information from the whole image. In yet another example, weakly supervised coupled convolutional network may be used to provide effective emotion recognition by utilizing local information in images. In some cases, the weakly supervised detection framework may be extended through a more detailed analysis for visual sentiment prediction.

In some cases, gating mechanisms (sometimes referred to as "attention mechanisms") are utilized to ensure that more resources are spent on more informative parts of input data. In an example, for an input signal, the importance of each of its datum is weighted through gating, producing appropriately weighted output signals. For example, a Squeeze-and-Excitation (SE) network may be utilized. For a deep feature, SE network may learn the pattern of importance degree in a channel-wise manner, generating a scaling vector that adjusts each feature channel. In some aspects, an SE network may be employed when fusing the semantic features, that may be obtained from a VL engine, and eye features to predict the emotional state. Further, the SE network may learn the emotional impacts from scene images. Other examples gating mechanisms that may be utilized may include, but are not limited to, transformer-based mechanisms and non-local network mechanisms.

Generally, emotion recognition methods for eyewear devices aim to identify the emotional state from expressions, e.g., using eye images. In an example, emotion may be discretely classified into six basic classes or categories: happiness, surprise, anger, fear, disgust, and sadness. In addition, neutrality may be used to represent the absence of emotions. In an example, a deep network $N_{eye}$ may be used to obtain emotional predictions from eye images $e^t = N_{eye}(E^t)$, where $e^t \in \{0, 1, 2, 3, 4, 5, 6\}$ represents the emotional state at time step t and $E^t \in \mathbb{R}^{H_1 \times W_1 \times 3}$ are eye images with height $H_1$ and width $W_1$.

In aspects of the present disclosure, an emotion analysis engine (e.g., the emotion analysis engine 120) may be configured to determine emotional state information using both eye images and visual perceptions, and the impacts of visual perceptions on this emotional state, i.e., emotionship, are quantitatively evaluated. Because the visual attentive region usually covers multiple semantic objects, the semantic attributes of the visual perceptions should be distinguished to avoid confusion of those objects.

Let $I^t \in \mathbb{R}^{H_2 \times W_2 \times 3}$ represent the scene image with height $H_2$ and width $W_2$. The emotion analysis engine 120 may determine the user's visual attentive region, or Region of Interest (RoI), in the scene images $I^t$. The RoI may be denoted as $r^t \in \mathbb{R}^4$. In an example, $r^t$ may be described as a rectangular area $(x_r^t, y_r^t, w_r^t, h_r^t)$, where $(x_r^t, y_r^t)$ is the central point of the rectangle, and $(w_r^t, h_r^t)$ denote the width and height of the rectangle, respectively, i.e., $r^t \in \mathbb{R}^4$. The visual perceptions, denoted as $I_{att}^t$, may be obtained by cropping the region $r^t$ out of $I^t$. In an aspect, the system may be configured to determine the emotional state $e^t$ from both the visual perceptions $I_{att}^t$ and eye images $E^t$ through a deep neural network $N_1$, i.e., $e^t = N_1(I_{att}^t, E^t)$.

In addition to $e^t$, the emotion analysis engine 120 may also determine the impacts of visual perceptions $I^t$ on this emotional state, i.e., the degree to which this emotion be attributed to visual experience. The impact may be defined as an influence score $IS^t \in [0,1)$ which may be computed by inferring from $I^t$, $E^t$, and $e^t$. Assuming a deep neural network $N_2$ is utilized, this can be written as $IS^t = N_2(I_{att}^t, E^t, e^t)$. In examples, a larger $IS^t$ score generally indicates that $e^t$ is more associated with what the user observes, and vice versa for a smaller value.

In some cases, the awareness of emotional state $e^t$ and the influence score $IS^t$ may not be sufficient to fully reveal the emotionship. For example, the semantic attributes of visual attentions may need to be understood to unambiguously describe the potential cause for $e^t$. The semantic attribute may be defined as a semantic representation (e.g., a textual representation or a summary tag) of the attentive region $I_{att}^t$, e.g., "white, warm beaches" if $I_{att}^t$ depicts a white beach in summer. The summary tag, denoted as $s^t$, may clarify the semantic cause for $e^t$ at an abstract level.

Let $ES^t$ represent the emotionship and it can be formulated as $$ES^t = (e^t, I_{att}^t, s^t, IS^t) \tag{1}$$

In aspects of the present disclosure, rather than isolating a user's emotional state from their surroundings and predicting only $e^t$, the emotion analysis engine 120 may additionally encode the potential causes for $e^t$, i.e., visual perceptions $I_{att}^t$ with semantic attributes $s^t$. Further, the degrees of the emotional influences of the potential causes may also be indicated by their influence scores $IS^t$. Such awareness of emotionship may enable eyewear devices to understand the semantic causes of emotions and also learn how visual experiences affect emotions in a personalized manner.

The disclosed emotionship analysis (e.g., that may be performed by the emotion analysis engine 120) faces several challenges. The first is how to appropriately discover the semantic attributes of visual attention. With the embedding of the forward-facing world camera, smart eyewear devices can estimate gaze points using eye-tracking techniques. Gaze points can be used to track human attention. However, knowing merely the gaze point may be insufficient, as there can be multiple semantic objects near this point that may influence the user's emotional state. To avoid ambiguity, the emotion analysis engine 120 may be configured to clearly identify semantic meanings in the vicinity of the gaze point. In an example, the emotion analysis engine 120 may generate the semantic summary tag $s^t$ of the visual perceptions $I_{att}^t$. In some cases, $s^t$ can be challenging to obtain, especially for eyewear devices. As described in more detail below, in various examples, the emotion analysis engine 120 may utilize visual features engine configured to extract the tag $s^t$.

After the visual attentive regions have been located with semantic understandings, another challenge is how to determine the associations between human visual attention and emotional state. The reason for emotional changes can be subtle. Such reasons may be associated, for example, with sentimental visual perceptions, e.g., when a user observes that a child is playing with parents and then cheers up, it can be assumed that the happiness is caused by this scene. However, sentimentally neutral visions can also proceed, but not cause sudden emotional changes. Therefore, it is crucial to correctly identify the emotional contribution of visual attention, i.e., to compute its influence score $IS^t$. In an example, the emotion analysis engine 120 is configured to implicitly determine $IS^t$ using, for example, a grating mechanism such as a deep neural network trained to obtain a scaling vector that reflects importance of various features.

Another challenge facing the prediction of emotional state $e^t$ is that sentimental information in visual perceptions that provides insights on the potential causes of emotions may not be, by itself, reliable enough to recognize emotion. In aspects of the present disclosure, the emotion analysis engine 120 may utilize expression-related information, e.g., eye-images, in addition to visual perception. In an example, the emotion analysis engine 120 may thus infer the emotional state $e^t$ from both the sentimental clues in visual perceptions and the expression-related information in eye images. As described in more detail below, a neural network, such as a Squeeze-and-Excitation network, may be provided to fuse the sentimental clues in visual perceptions and the expression-related information in eye images. In various examples, inferring the emotional state $e^t$ from both the sentimental clues in visual perceptions and the expression-related information in eye images may lead to more robust emotion recognition performance.

Figure 2:
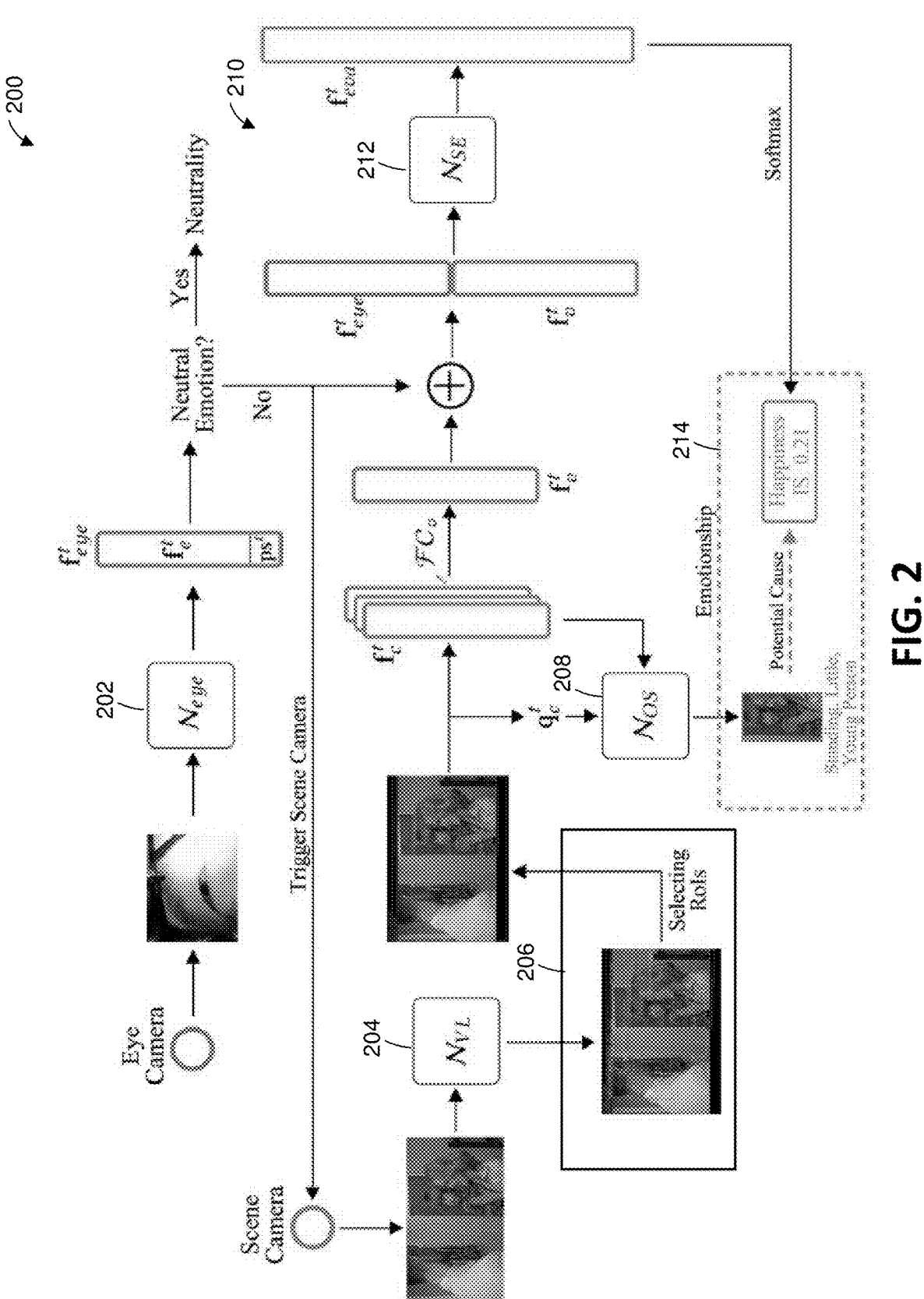
FIG. 2 is a diagram depicting an example system implementation of the emotion identification system of FIG. 1 in accordance with an example.

Turning now to FIG. 2, a diagram depicting an example implementation of a system 200 configured to identify emotional state according to one example is provided. The system 200 generally corresponds to, or is utilized with, the system 100 of FIG. 1 in some examples. For example, the system 200 (sometimes referred to herein as "EMOShip-Net") corresponds to, or is included in, the emotion analysis engine 120 of FIG. 1.

The input to the network 200 at a time t may include two video streams: the eye images $E^t$ captured by an inward-facing eye camera (e.g., the eye camera 102 of FIG. 1) and the scene images $I^t$ recorded by a forward-facing world camera (e.g., the world camera 104 of FIG. 1). In some aspects, the high-resolution world camera consumes more energy than the low-resolution eye camera: it would be too energy-intensive to continually capture scene frames. Considering the energy limitations of wearable devices, the system 200 may be configured to use a "trigger" mechanism for the world camera may be used. For example, the system 200 may keep tracking eye images $E^t$ and may monitor a rough emotional state, e.g., whether the emotional state is neutral or non-neutral, based, for example, on features $f_{eye}^t$ that, as explained in more detail below, may be obtained from the eye images $E^t$. When a non-neutral emotion is spotted, the forward-facing world camera may be triggered to record scene $I^t$. The system 200 may thus skip emotional-neutral frames (e.g., because there is no need to analyze the emotionship for neutral emotions) and focus on frames with non-neutral emotions. In an example, a binary classifier $C_{eye}$ may be provided to separate $f_{eye}^t$ into neutral and non-neutral expressions. If $f_{eye}^t$ is classified as emotionally neutral, the world camera is disabled to save energy. Otherwise, the world camera is triggered to enable the following operations.

A vision-language (VL) engine may then be applied to extract multiple (e.g., all potential) regions of interest (RoIs) with semantic tags in $I^t$. The visual attentive region may then be determined from the RoIs based on the gaze point, and a summary tag for the selected area may obtained by a Question Answering (QA) process using a vision-language fusion engine, such as the OSCAR+ vision-language fusion engine. The features of the attentive regions, which may also be provided by the VL engine, may be fused with the eye features using, for example, a Squeeze-and-Excitation (SE) network, to generate the final prediction on the emotional state. A scaling vector that may be obtained, for example, by the SE network's excitation operation may reveal the emotional impact from visual attentions, or the influence score $IS^t$.

Eye images $E^t$ contain information about facial expressions. In an example, an enhanced EMO method to extract expression-related features from the eye images $E^t$ may be used. Generally, EMO consists of a feature extractor for eye images and a customized emotional classifier. In aspects of the present disclosure, the system 200 may include an eye feature extraction $\mathcal{N}_{eye}$ engine 202 (e.g., a feature extractor based on ResNet-18 backbone) configured to extract $f_e^t \in \mathbb{R}^{128}$ i.e., $f_e^t \mathcal{N}_{eye}(E^t)$. However, because emotion recognition in eye images may not be need, instead of using the customized classifier of EMO, the system 200 may utilize a binary classifier for neutral/non-neutral predictions. In an aspect, pupil information may be appended to the extracted features a before feeding the features are fed into the binary classifier, because statistical eye information such as pupil size can help to improve the emotion recognition accuracy.

Denoting the pupil size information as $ps^t \in \mathbb{R}^2$, the system 200 may treat $ps^t$ as expert information that may be concatenated with $f_e^t$, which can be written as $f^t = [f_e^t, ps^t]$, where the square bracket indicates channel-wise concatenations.

Eye features $f_{eye}^t \in \mathbb{R}^{130}$ encode the expression-related information within eye regions and can be seen as an effective emotional indicator. In an aspect, as described in more detail below, $\mathcal{N}_{eye}$ is only applied to eye images when a particular eye attention pattern is identified to save energy. The trigger of the world camera, on the other hand, may depend on eye feature $f_{eye}^t$.

The triggered forward-facing world camera records scene images $I^t$. The system 200 may estimate, from $E^t$, the gaze point area $g^t = (x_g^t, y_g^t)$, where $x_g^t$ and $y_g^t$ refer to the 2D coordinates of this gaze point with respect to scene image $I^t$. Because $g^t$ is a 2D point, the system 200 may determine region of visual perceptions $r^t = (x_r^t, y_r^t, w_r^t, h_r^t)$.

The system 200 may also include a vision-language $\mathcal{N}_{VL}$ engine 204 that may be trained or otherwise configured to generate a number of (e.g., all) potential regions of interest in the scene images $I^t$. In an aspect, the $\mathcal{N}_{VL}$ engine 204 may comprise a VinVL engine trained or otherwise configured to generate all potential regions in $I^t$, and then perform filtering to select certain RoI candidates for $r^t$ from all those regions. In other aspects, other suitable ROI identification engines, such as other suitable vision language engines, may be utilized. Given the scene image $I^t$, the $\mathcal{N}_{VL}$ engine 204 may generate a total of K potential regions $\{R_1^t, R_2^t, \ldots, R_K^t\}$, where $R_i^t \in \mathbb{R}^4$ represents the i-th candidate. For a RoI $R_i^t$, the $\mathcal{N}_{VL}$ engine 204 generates a corresponding visual representation (or feature) $f_{R_i}^t \in \mathbb{R}^{2048}$ and the semantic representation $q_{R_i}^t$ (e.g., a tag).

The system 200 may also include a selection engine 206 configured to perform filtering to select certain RoI candidates for $r^t$ from the potential ROIs generated by the $\mathcal{N}_{VL}$ engine 204. In an aspect, selection engine 206 may utilize a filtering process to select a number (e.g., ten) most suitable regions out of all K regions based on the gaze point $g^t$. For example, for each candidate $R_i^t$, the selection engine 206 may compute the Euclidean distance between a central point of the candidate $R_i^t$ and the gaze point $g^t$. The selection engine 206 may then empirically select a number (e.g., ten) regions with the smallest distances, i.e., the regions that are closest to the gaze point. These are the most relevant RoIs within the visual attentive region. In an example with ten selected ROIs, the selected ROIs may be denoted as $R_c^t = \{R_{C1}^t, R_{CT}^t, \ldots, R_{C10}^t\}$.

After the filtering process, there are still a number (e.g., ten) RoI candidates, and the system 200 may be configured to determine a final visual attention region and also to generate its semantic representations (e.g., summary tags). In an aspect, the system 200 may utilize two Question Answering (QA) sessions for this purpose. For example, the system 200 may utilize Visual Question Answering (VQA) and Image Captioning, which may use a vision-language fusion (e.g., OSCAR+) engine, to determine a final visual attention region and to generate a summary tag based on the visual features $f_{R_i}^t \in \mathbb{R}^{2048}$ and the corresponding semantic representations (e.g., attributes) $q_{R_i}^t$ generated by the $\mathcal{N}_{VL}$ engine 204 for the regions of interest $R_c^t = \{R_{C1}^t, R_{C2}^t, \ldots, R_{C10}^t\}$ selected by the selection engine 206 (in the example with ten selected ROIs). The system 200 may include vision-language fusion $\mathcal{N}_{OS}$ engine 208 (e.g., an OSCAR+ engine) configured to determine the appropriate visual attentive region $r^t$ based on visual features $f_c^t = \{f_{C1}^t, f_{C2}^t, \ldots, f_{C10}^t\}$ and corresponding semantic attributes $q_c^t = \{q_{C2}^t, q_{C2}^t, \ldots, q_{C10}^t\}$ generated by the $\mathcal{N}_{VL}$ engine 204 for the ROIs $R_c^t = \{R_{C1}^t, R_{C2}^t, \ldots, R_{C10}^t\}$ selected by the selection engine 206.

In an aspect, for the QA session, the system 200 may evoke the $\mathcal{N}_{OS}$ engine 208 to answer the question $Q_1$ "What object makes people feel emotions, e.g., happy/surprised/sad/angry/feared/disgusted" by inferring to $f_c{}^t$ and $q_c{}^t$ to obtain an answer $$a^t = \mathcal{N}_{OS}(Q_1, f_c{}^t, q_c{}^t) \tag{2}$$

Then among the attributes $q_c{}^t$, the system 200 may find the attribute $q_{cj}{}^t$ whose word2vec embedding is closest to that of answer at than all other attributes, and may identify the ROI $R_{cj}{}^t$ corresponding to the attribute $q_{cj}{}^t$ as the visual attentive region $r^t$, i.e., $r^t = R_{cj}{}^t$.

Further, for the IC session, the system 200 may evoke the $\mathcal{N}_{OS}$ engine 208 to generate an appropriate tag that summarize the semantic attributes of visual perception region. In this session, there is no question to answer, and $\mathcal{N}_{OS}$ engine 208 may only looks at the visual features $f_c{}^t$ to generate the tags, which may be expressed as $$s^t = \mathcal{N}_{OS}(f_c{}^t) \tag{3}$$

where $s^t$ is the summary tag for the visual attention region.

The system 200 may also include an emotion state determination engine 210 configured to obtain the emotional state $e^t$ through synthesis of eye features $f_{eye}{}^t$ obtained from the $\mathcal{N}_{eye}$ engine 202 and visual features $\{f_{c1}{}^t, f_{c2}{}^t, \ldots, f_{c10}{}^t\}$ of the candidate RoIs selected by the selection engine 208. Due to different dimensionalities of $f_c{}^t$ and $f_{eye}{}^t$ (e.g., $f_c{}^t \in \mathbb{R}^{10 \times 2048}$ and $f_{eye}{}^t \in \mathbb{R}^{130}$), a Fully Connected (FC) layer $f_c{}^t$ may be first employed to summarize and reduce dimensionality of $f_c{}^t$. Thus, $f_v{}^t = FC_v(f_c{}^t)$ may be obtained, where $FC_v$ denotes the FC layer and the dimensionality of $f_v{}^t$ is the same as the dimensionality of $f_{eye}{}^t$ (e.g., $f_v{}^t \in \mathbb{R}^{130}$). The channels of visual perceptions' feature $f_v{}^t$ and eye features $f_{eye}{}^t$ may then be concatenated to generate $f_{ev}{}^t = [f_v{}^t, f_{eye}{}^t]$. The concatenated feature $f_{ev}{}^t$, which may be of dimensionality $f_{eye}{}^t \in \mathbb{R}^{260}$, contains emotional information from both the eye and scene images. The concatenated feature $f_{ev}{}^t$ may be fed to a Squeeze-and-Excitation (SE) $\mathcal{N}_{SE}$ engine 212, which may comprise a neural network, to obtain a scaling vector $u^t$ (e.g. $u^t \in \mathbb{R}^{260}$). i.e., $u^t = \mathcal{N}_{SE}(f_{ev}{}^t)$. In an aspect, the scaling vector $u^t$ is learned from the SE gating mechanisms and the scaling vector $u^t$ thus reflects the importance degree of each channel in $f_{ev}{}^t$. The scaling factor $u^t$ may be multiplied (channel-wise) with the concatenated features $f_{ev}{}^t$ to obtain a feature $f_{eva}{}^t$ (e.g., $f_{eva}{}^t \in \mathbb{R}^{260}$), i.e., $f_{eva}{}^t = u^t{}^* f_{ev}{}^t$, where * represents channel-wise multiplication. The final emotion prediction $e^t$ may then be determined based on the obtained feature $f_{eva}{}^t$. For example, the obtained feature $f_{eva}{}^t$ may be input to a soft-max classifier $C_{EMO}$ to generate the final emotion prediction $e^t$, i.e., $e^t = C_{EMO}(f_{eva}{}^t)$.

The system 200 may further include an emotionship engine 214 that may be configured to compute an Influence Score (IS) that indicates the degree of emotional impact from visual perceptions. In an aspect, the emotionship engine 214 may compute the IS from the scaling vector $u^t$ learned from the SE grating mechanisms. As discussed above, the scaling vector $u^t$ may represent the importance degree of each channel in $f_{ev}{}^t$ and $f_{ev}{}^t$ may consist of eye features $f_{eye}{}^t$ concatenated with visual perception's feature $f_v{}^t$. Thus, the emotionship engine 214 may evaluate the importance of the visual perception feature $f_v{}^t$, in predicting emotional state by calculating the Influence Score $IS^t$ using $u^t$. In an example, the emotionship engine 214 may calculate the $IS^t$ according to $$IS^t = \frac{\sum_{i=1}^{130} u_i^t}{\sum_i u_i^t}, \tag{4}$$

where $u_i^t$ denotes the i-th scalar of the vector $u^t$ and the first 130 scalars of the vector $u^t$ correspond to the channels of the feature $f_v{}^t$. Using the influence scores in Equation 4, a determination of to which degree an emotional state was affected by the sentimental visions may be made. For instance, if a really small ISt is computed, it may be concluded that the current emotional status is not related to the observed visual perceptions. In contrast, if a large ISt value implies that the current emotion is highly related to the attentive scene regions.

It is noted that, in the interest of simplicity and conciseness, emotion prediction is generally described herein for a certain time step t. However, emotions are generally temporally consistent processes instead of static ones, and therefore aspects of the present disclosure aggregate emotion predictions in different time steps. For a video clip of T frames, with computed emotion prediction for each frame, i.e. $\{e_1, e_2, \ldots, e_T\}$, the most common emotion class $e_m$ may be used as the emotion prediction of this sequence. In an aspect, the most common emotion class $e_m$ is computed according to $$e_m = \arg\max_i \sum_{j=1}^{T} \mathbb{1}(e^j = i), \tag{5}$$

where, in the six-emotion classification example, $i \in (1, 2, 3, 4, 5, 6)$; $\mathbb{1}$ represents the indicator function, $\mathbb{1}(e^j = i) = 1$ if $e^j = i$ $\mathbb{1}$ and $(e^j = i) = 0$ if $e^j \neq i$.

As described above, the EMOShip system may be configured as a smart eyewear system equipped with two cameras, including one outward-facing world camera and one customized inward-facing eye camera. The outward-facing world camera generally collects the visual content aligned with the wearer's field of view. In an example, Logitech B525 1080p HD Webcam (1280×960@30 fps) may be used. In other examples, other suitable cameras and/or other sensors may be used. The inward-facing eye camera generally supports continuous eye tracking and eye-related expression feature capture. In an example, a camera module with a GalaxyCore GC0308 sensor (320× 240@30 fps) and an IR LED light to illuminate the iris may be used. In other examples, other suitable cameras and/or other sensors may be used. The EMOShip system may be further equipped with a wearable system-on-module solution, such as a device provided by Qualcomm that combines Qualcomm Snapdragon XR1 chipset with an eMCP (4 GB LPDDR/64 GB eMMC). Typical power consumption of such device may be as low as 1 W, for example, which is suitable for battery-powered wearable design.

In EMOShip, EMOShip-Net performs emotion recognition and emotionship analysis. In an example, targeting energy-constrained wearable scenarios, EMOShip-Net uses the following energy-efficient workflow:

First, EMOShip-Net continuously senses the eye camera to perform eye tracking. To minimize the energy cost of eye tracking, EMOShip-Net uses a computationally efficient pupil detection and tracking method to detect potential attention events. In an example, a potential attention event must satisfy two conditions simultaneously: (1) there is a temporal transition from saccade to smooth pursuit, which suggests a potential visual attention shift and (2) the gaze follows a moving target or fixates on a stationary target. Pupil software configured to predict two eye movements—fixation and non-fixation—based on the degree of visual angles. In aspects of the present disclosure, Pupil software may be modified to achieve more accurate eye movement pattern detection. In an example, more eye movements such as saccade and smooth pursuit may be needed to detect a potential visual attention event. To address this issue, the Pupil software may be configured to use historical gaze trajectory profile to enable a more accurate eye movement detection. This is motivated by the occurrence of smooth pursuit or fixation eye movements when the recent gaze points are located in a constrained spatial region; otherwise, a saccade eye movement occurs. In examples, the detection of eye movements with 99.3% accuracy has been achieved. This shows that the eye movement detection method of the present disclosure is robust and reliable. In an example, the inference time of the eye-tracking method used in EMO-Ship-Net is 115.1 fps, or 8.7 ms/frame.

Once a potential attention event is detected by the computationally efficient eye-tracking method, EMOShip-Net takes the eye images as the input of the light-weight network $N_{eye}$ to extract eye-related expression related information and performs neutral vs. non-neutral emotional state classification. $N_{eye}$ is computationally efficient. In an example, Neye requires only 20.3 ms to perform emotional state classification for each eye image frame.

Only when a non-neutral emotional state is detected, EMOShip-Net activates the high-resolution world camera to sense scene content for semantic analysis. In other words, the high-resolution, energy-intensive scene content capture and processing the pipeline remains off most of the time, avoiding unnecessary data sensing and processing, thereby improving energy efficiency.

Finally, EMOShip-Net leverages a cloud infrastructure to perform computation-intensive semantic attribute feature extraction and eye-scene feature aggregation to support final emotion recognition and emotionship analysis, thus offloading energy consumption from the eyewear device.

The energy consumption of the EMOShip eyewear device is estimated as follows:

$$E_{EMOShip}=T_{always-on}\times(P_{eye\ camera}+P_{eye\ tracking})+T_{N_{eye}}\times P_{N_{eye}}+T_{captured}\times P_{world\ camera}. \quad (6)$$

where $T_{always-on}$ is the overall operation time of the EMO-Ship eyewear device, $P_{eye}$ camera and $P_{world}$ camera are the power consumption of the eye camera and the world camera, respectively, $T_{Neye}$ is the operation time of the light-weight eye analysis network $N_{eye}$, and T captured is the operation time of the high-resolution video recording when non-neutral emotional states are detected.

FIG. 3A illustrates the run-time operation of EMOShip on the eyewear. Physical measurement of the Qualcomm Snapdragon wearable platform shows that $P_{eye\ camera}=0.07$ W, $P_{eye\ tracking}=0.1$ W, $P_{world\ camera}=1.3$ W, and $P_{Neye}=1.1$ W. Physical measurement during the real-world pilot studies described in more detail below shows that $N_{eye}$ and the world camera remain off during 86.8% and 94.6% of the system operation time, respectively. In some examples, a 2.1 Wh battery (similarly to Google Glass Explorer Edition), may allow EMOShip to support a suitably large amount of time (e.g., 5.5 hours) of continuous operation without charging.

FIG. 3B illustrates the run-time operation that performs continuous recording with both eye camera and world camera. The overall system energy consumption is this case is $E_{always-on}=T_{always-on}\times(P_{eye\ camera}+P_{world\ camera})$ resulting in a battery lifespan of approximately 1.5 hours. Compared with the record-everything case, EMOShip improves the system battery lifetime by 3.6 times, in at least some examples.

To evaluate EMOShip, a dataset that includes the scene images observed by the wearer, the wearer's eye images, and also the emotional states during this observation process may be utilized. Such dataset (sometimes referred to herein as "EMO-Film" dataset) may be collect and built as detailed below.

The data of EMO-Film dataset may be collected in a controlled laboratory environment. As shown in FIG. 4A, participants equipped with EMOShip may be instructed to watch several emotion-eliciting video clips displayed on a desktop monitor. In an example, a total of 20 volunteers attended data collection of EMO-Film, including 8 females and 12 males.

The video clips may be selected from a suitable video dataset, such as the FilmStim dataset 6 emotion-eliciting video dataset or another suitable emotion-eliciting video dataset. In an example, videos of the video dataset (64 video clips in total) may be divided into a number (e.g., seven) classes or categories based on the provided sentiment labels, each category corresponding to one emotional class (neutral plus six basic emotions). Then, at least one video clip may be randomly sampled from each category summing up to a number (e.g., six or seven) of videos for a participant to watch. In an example, the film clips (e.g., in the FilmStim dataset) evoke a broad range of emotional reactions, so this design covers the six basic emotions. In an example, a study may be conducted in which each film clip is watched by at least two subjects.

During the watching process, the eye regions of participants may be recorded using the eye camera. To ensure the video scenes can be captured properly, the field of view of the world camera may be pre-adjusted to be aligned with the monitor and recorded the displayed video simultaneously. In this way, the eye/scene data and the emotion ground-truths with aligned timelines may be gathered, as shown in FIG. 4B. In an example study, this recording session takes approximately 20 minutes per person.

After all the scheduled movie clips displayed, the participant may be instructed to take a short break (e.g., around 20 minutes) and then to label their emotional states. In an example, this labeling process may take up to 70 minutes (compared with 20 minutes of watching the films) and the generated emotional annotations may be accurate because the videos were shown only 20 minutes prior. In an aspect, a labeling tool with a GUI window may be provided to facilitate this process. Use of the tool may be orally explained to each participant. Using the tool, for each eye/scene image pair, the participant may indicate emotional state by clicking on the corresponding button or using a keyboard shortcut. In an example, there may be a total of seven emotional states to choose from: neutral plus the six basic emotions. Only one emotional state per time instant may be considered, for simplicity. This process may be repeated until all eye/scene image pairs have been assigned labels.

In an example study, the whole data collection process took approximately four days, and the gathered data and labeling lasted for approximately 1.5 hours per participant.

In an aspect, the collected EMO-Film dataset may be further divided into two sets for the purpose of training/testing, respectively. For example, the video data of each subject may be split into 80%/20% for training/testing based on the timestamps. The 80% clips with smaller timestamps (i.e., recorded at an earlier time) may be assigned as the training set, and the rest 20% clips may be assigned as the testing set. The overall percentages of video sequences belong to "anger"/"disgust"/"fear"/"happiness"/"sadness"/ "surprise" are 2.9%/18.2%/20.8%/20.0%/20.8%/17.3%, respectively.

As shown in Table 1, there are a total of 144,145/45,338 eye-scene image pairs in the training/testing set, respectively, in the example dataset. Each eye-scene frame pair is properly aligned in timelines, and the frame-level emotion ground truths are also provided. In an example, the resolution for scene images is 1280×960 and the resolution of eye images is 320×240. The distribution of the seven emotion classes, in the example dataset, is also shown in Table 1. As can be seen, "fear" accounts for the most non-neutral emotion events, while "anger" accounts for the fewest. The number of "neutrality" clips is similar to that of "fear". In aspects, data augmentation techniques, including the rotations, flips, and affine transforms, may be applied to balance the distribution of different emotional states during the training stage, which can be important to the training of the neural network (e.g., EMOShip-Net).

where $B(TP_j, FP_j, TN_j, FN_j)$ represents binary classification performance on label j ($B \in \{$Accuracy, Precision, Recall$\}$) and C is the number of emotion classes (e.g., C=6). In an example, $TP_j$, $FP_j$, $TN_j$, and $FN_j$ denote the number of true positive, false positive, true negative, and false negative test samples with respect to the j class label, respectively.

The quality of the disclosed system, i.e., the accuracy of the disclosed system in identifying the causes of emotions, has been evaluated using several baseline systems. Because it may be difficult to objectively annotate such potential causes, as they are generally highly personalized, subjective, and subtle, several representative samples have been visualized to compare the qualities of semantic attributes generated by EMOShip and a baseline based on VinVL. The variation of Influence Score by scenario was plotted to demonstrate whether EMOShip has correctly captured the emotional impacts from scene images.

To evaluate the performance of emotion recognition, four systems were used as baselines: 1) the emotion-aware smart glasses EMO, 2) EMO+, which is an improved version of EMO, 3) VinVL that extracts semantic scene features for emotion recognition, and 4) VinVL+ that is modified to focus on the attentive regions of users.

TABLE 1

| Emotional States | Anger | Disgust | Fear | Happiness | Sadness | Surprise | Neutrality |
|---|---|---|---|---|---|---|---|
| Number of eye-scene image pairs in training set | 3,519 | 21,844 | 25,000 | 23,807 | 24,080 | 20,895 | 25,000 |
| Number of eye-scene image pairs in testing set | 990 | 2,843 | 8,693 | 4,214 | 7,068 | 3,801 | 17,729 |

When viewing identical sentimental contents, different participants may demonstrate different emotional reactions. To examine inter-participant variability, the videos may be first divided into a number (e.g., six) sentimental classes or categories excluding neutral, each category corresponding to one emotional class. For each category, the percentage of video frames for which all subjects demonstrate exactly the same emotional reactions may be calculated. FIG. 5 illustrates the percentage of video frames where all subjects demonstrate exactly the same emotional reactions for different emotional classes. As shown in FIG. 5, "surprise" can be most easily aroused and shared among people watching the same videos, while there are also a comparatively high proportion of subjects who share the same emotional feelings from viewing content related with "disgust", "fear", and "sadness". "Happiness" and "anger", however, have the lowest probability of commonality across users, suggesting more personal variation in the perception of such videos.

Emotionship, as defined in Equation 1, may capture the emotional states of the user and may also describe their potential causes. Because frame-level ground-truth emotion values are provided in the EMO-Film dataset, the evaluation of the former (emotional state prediction) is comparatively straight-forward. In an example, a multilabel-based macro-averaging metric may be used to evaluate the performance of emotional state predictions, e.g., as defined in Equation 7.

$$B_{macro}(h) = \frac{1}{C}\sum_{j=1}^{C} B(TP_j, FP_j, TN_j, FN_j),$$ (7)

EMO utilizes a deep CNN to recognize emotions from eye images. In examples below, EMO is used as a primary baseline. The classifier in EMO has been discarded because it requires the construction of an auxiliary face recognition database, which is resource-intensive and brings very limited improvement.

Pupil size information was integrated with EMO to improve its recognition accuracy. In particular, pupil size is used as a kind of expert information, which is concatenated to the second last Fully Connected (FC) layer of the CNN. This baseline method is denoted as EMO+.

Both EMO and EMO+ predict emotions from the eye images. However, hints on emotional states can also be fetched from scene images, especially from those sentimental visions that are more likely to evoke emotions. To validate this, a third baseline method that predicts emotional states using only the sentimental clues in scene images was devised. More specifically, VinVL was used to extract visual features from scene images containing sentimental information. Then, those visual features are fed to a classifier consisting of two layers to obtain the emotion predictions. Regarding the summary tag generation, all the visual features are input into OSCAR+ to obtain summary tags. This approach is referred to herein VinVL for simplicity.

The visual features of VinVL contain information from all potential Regions of Interest (RoIs). There can be various sentiment clues in those RoIs. However, it is the sentimental information from the user's attentive region that really matters. Therefore, VinVL may be set to consider only those features within the user's attentive region. This method is referred to herein as VinVL+.

To better understand the causes of emotions, summary tags generated by EMOShip has been compared with VinVL+ to provide an intuitive illustration of the qualities.

In an example, as described above, the structure of EMOShip-Net involves several backbone networks with different architectures and design purposes. Instead of end-to-end training, an iterative method to train EMOShip-Net may be used. In an example, each component network may be trained individually while freezing the weights of other parts.

The eye network $\mathcal{N}_{eye}$ is used frame-wise and serves as the trigger for the scene camera. It is therefore the first component trained, in an example. In an example, $\mathcal{N}_{eye}$ may be pre-trained with cross-entropy loss on one or more suitable datasets (e.g., FER2013 dataset and MUG dataset). FIG. 6. Illustrates seven emotional expressions of the original MUG facial expression examples (top row) and a fine-tuning single-eye-area data cropped from MUG (bottom row) in accordance with an aspect of the present disclosure. In an example, the eye regions in the MUG dataset are cropped out of the facial image, as shown in FIG. 6. The pre-trained $\mathcal{N}_{eye}$ may be further fine-tuned on the training set of the collected (e.g., EMO-Film) dataset.

In some examples, considering the high complexity in visual features neural network $\mathcal{N}_{VL}$ and the vision-Language neural network $\mathcal{N}_{OS}$, predetermined pre-trained weights may be used. The Squeeze-and-Excitation neural network $\mathcal{N}_{SE}$ may be trained together with the FC layer $FC_v$ on EMO-Film dataset. A suitable optimizer (e.g., the Adam optimizer) may be used. An initial learning rate may be 0.001 and the batch size may be set to 512. The training process may last for a suitable number of epochs (e.g., a total of 500 epochs).

In an example, the neutral/non-neutral classification results from $T_{n_{eye}}$ serve as a trigger to capture emotional moments, and the accuracy of this binary classification can directly affect the performance of the whole system. Therefore, the quality of binary classification EMO+ may be evaluated first to determine whether the triggering system is reliable. As shown in Table 2, in an example, EMO+ significantly outperformed the baseline EMO and achieved 80.7% precision, 79.0% recall, and 80.4% accuracy on this binary classification task. This demonstrates the value of adding pupil information in EMOs. The high accuracy achieved by EMO+ also indicates that EMOShip-Net is sensitive to emotional moments.

TABLE 2

| Method | Precision | Recall | Accuracy |
|---|---|---|---|
| EMO+ | 80.7% | 79.0% | 80.4% |
| EMO | 78.1% | 74.6% | 76.9% |

Table 3 demonstrates the emotion recognition performance of the four baseline methods and EMOShip-Net on EMO-Film dataset.

TABLE 3

| Method | Precision | Recall | Accuracy |
|---|---|---|---|
| EMOShip-Net (Disclosed) | 76.3% | 73.6% | 80.2% |
| EMO+ | 71.0% | 67.8% | 74.2% |
| EMO [61] | 65.9% | 67.0% | 69.4% |
| VinVL+ | 48.8% | 46.8% | 57.3% |
| VinVL [66] | 42.6% | 44.3% | 55.5% |

As can be seen from table 3, in an example, EMO significantly outperformed VinVL [66] in terms of precision, recall, and accuracy. This may be due to the emotional clues within eye images being more generally straightforward compared with the indirect and subtle sentimental clues in scene images. EMO+, the improvement version of EMO, has superior performance to EMO, indicating the value of integrating pupil size information. The performance of VinVL+ also surpasses that of VinVL, which illustrates the importance of involving user attention. However, VinVL+ still could not outperform EMO and EMO+, indicating the importance of expression-related features.

Different from those baselines, EMOShip-Net fuses emotional evidence of both scene and eye images to achieve more comprehensive and accurate emotion predictions. In an example, EMOShip-Net significantly outperformed the best baseline EMO+ by 5.3% precision, 5.8% recall, and 6.0% accuracy. This reveals the importance of inferring from both facial expressions and visual perceptions, and indicates the superiority of EMOShip-Net in determining emotional states.

FIGS. 7A-C illustrate confusion matrices of individual emotional moments when using VinVL+ and EMO+ baseline methods and the disclosed EMOShip methods. FIGS. 7A-C demonstrate that EMOShip-Net achieves a better recognition rate for most emotions, demonstrating its superior generalization ability. FIGS. 7A-C also demonstrate that EMOShip may perform slightly worse on "disgust" than EMO+, in some cases. That is because EMO+ determines emotional states exclusively based on eye images, while EMOShip takes both the visual region and eye images into consideration. This may undermine accuracy when EMOShip receives strong misleading signals from visual attentive regions, in some cases. For example, when scene images containing emotionally negative material are captured, it can be challenging for EMOShip to determine which kind of negative emotions (such as "disgust" or "fear") should be related to this visual information since they may all occur in response to negative scenes. As shown in FIGS. 7A and 7B, the VinVL+ method, which only utilizes visual information, generally delivers lower classification rates on negative emotions such as "disgust" and "anger" than EMO+, while its recognition accuracy on other classes, such as "happiness" and "sadness", are relatively similar. Generally, associations between negative sentimental visions and negative emotions can be challenging to establish.

FIG. 8 shows example of emotion recognition comparison between the disclosed EMOShip-Net methods and VinVL+ and EMO+ baseline methods. Shades of rectangles in FIG. 8 indicate the true emotions and the emotions predicted by the disclosed EMOShip-Net methods and VinVL+ and EMO+ baseline methods. More specifically, FIG. 8 presents successive scene/eye image sequence and corresponding emotion predictions within an approximate six-second clip generating "fear" emotions. Both VinVL+ and EMO+ baseline have produced inconsistent emotion predictions during this clip, while the disclosed EMOShip-Net has successfully predicted fear as the result of viewing all those frames. This demonstrates that the disclosed EMOShip-Net produces more temporal-consistent emotional predictions. This may be due the fusion of emotional evidence from both visual scenes and eye regions.

The disclosed systems and methods face a challenge in that understanding the cause of emotions can be too subtle and subjective to be quantitatively evaluated, especially to compute the Influence Score IS, i.e., the intensity of emotional response to visual perceptions. Despite those challenges, EMOShip may reveal the semantic attributes of visual attention and to associate those attributes with varying emotional states. In examples, cases of different emotions may be used to present the qualities of the summary tags of visual attentive regions, and the Influence Score may be plotted from real video clips to examine their temporal patterns.

FIGS. 9A and 9B show examples of the semantic summary tags generated by the disclosed system and the VinVL baseline system, respectively. In FIGS. 9A-B, the generated summary tag are shown at the bottom of each frame, circles indicates the gaze point, and the emotional words are highlighted in bold. FIGS. 9A-B generally show that, in an example, the summary tags generated by the disclosed system has better captured the sentimental clues in those scenarios than has the VinVL baseline. For example, in the "fear" case, the summary tag of EMOShip contains emotion-indicating keywords such as "screaming", which is highly relevant with negative emotions like "fear" and is clear evidence of awareness of the sentimental visions. In contrast, VinVL displays neutral descriptions and uses words like "talking" to depict this scene, which are less sentimentally accurate. Similar observations can be made on other emotions where EMOShip uses more emotional indicators such as "dirty room", "screaming face", "dark room", etc. These differences may be due to the visual features used in the VinVL baseline method not being filtered and consisting of visual information from non-attentive regions. Such irrelevant information can confuse the language engine and can lead to less appropriate summary tags like the sentimentally neutral words. In contrast, in an example, the disclosed system uses the selected visual features that are highly relevant to the visual attentive region, thus generating summary tags that are more relevant to the visual attentive region and more likely to contain sentimentally non-neutral meanings.

The tags of the disclosed system are generally more semantically accurate than VinVL. Using "fear" as an example, EMOShip correctly depicts the scenario, i.e., "A young girl is screaming while sitting on a bench", while VinVL's description is less appropriate, i.e., "A young girl is talking on a cellphone". This semantic accurateness is also an advantage of EMOShip.

FIG. 10 illustrates how different emotional states can be associated with scene features through the use of Influence Score IS, in at least some examples. More specifically, FIG. 10 shows a bar chart illustrating degree of emotional impacts from visual perceptions. In particular, FIG. 10 shows the normalized average IS of six non-neutral emotional classes or categories. As can be seen in FIG. 10, the emotion "sadness" exhibits the highest the IS value. This indicates that emotion "sadness" is generally more tightly associated with one's visual perceptions than others. Also, emotion "surprise" presents the lowest IS score and is therefore considered to be less related with scene features than all other emotions.

In an example, the generalization ability of EMOShip-Net on unseen users may be evaluated. For example, a number (e.g., five) new participants out of the EMO-Film dataset may be recruited, and identical data collection procedures as discussed above may be used to produce an evaluation data set that is strictly subject-independent with the EMO-Film dataset used to train the disclosed system. In an example, five new participants were recruited, and the new evaluation set was approximate 105 minutes in length. The in-lab emotion recognition performance of EMOShip-Net may be measured based on this newly collected unseen dataset. In an example, the performance of EMOShip-Net on this new test set was compared with that of the EMO and EMO+ baseline methods (the two most out-standing baseline methods). The results are shown in Table 4. It can be seen that EMOShip-Net showed superior performance relative to EMO and EMO+. This indicates that EMOShip-Net can generalize well to unseen subjects.

TABLE 4

| Method | Precision | Recall | Accuracy |
|---|---|---|---|
| EMOShip-Net (Ours) | 65.9% | 76.6% | 78.5% |
| EMO+ | 62.8% | 65.4% | 70.0% |
| EMO | 61.2% | 60.3% | 61.4% |

In an example, the performance regarding F1 scores of different methods on two test sets may be examined. The performance of a particular method may differ depending on which test set is used, because one test set may be more challenging than the other. In an aspect, F1 scores of different methods on the original/new test set along with the drop rates may be computed. As shown in Table 5, in an example, all methods performed worse on the new test set. This indicates that the new test set was more challenging than the original test set. Nonetheless, the performance of EMOShip-Net degraded the least on this new set, suggesting the importance of exploiting emotionship.

TABLE 5

| | F1 Score | | |
| Method | Original Test Set (Subject-dependent) | New Test Set (Subject-independent) | Drop Rate |
|---|---|---|---|
| EMOShip-Net | 74.9% | 70.8% | 5.4% |
| (Disclosed) | 69.4% | 64.1% | 7.6% |
| EMO + EMO | 66.4% | 60.7% | 8.6% |

In addition to or instead of in-lab experiments, in-field studies may be performed for system evaluation. In an example, an approximate three-week in-field pilot study was performed to evaluate the performance of EMOShip under realistic scenarios. In examples, such in-field studies reveal real-life applications of the disclosed systems and methods and demonstrate usability of the disclosed systems and methods outside the laboratory.

In an aspect, an advantage of EMOShip is that it captures emotionship instead of emotions. Compared with other emotional-aware glasses like EMO, EMOShip not only predicts emotions at higher accuracy but also provides intuitive explanations on the potential causes of those emotional states. This awareness of emotionship opens the door to new applications. Multiple rounds of user interviews lead to two useful applications: Emotionship Self-Reflection and Emotionship Lifelogging.

In psychology, the term "self-reflection" refers to the process of analyzing past behaviors to achieve better efficiency in the future. Self-reflection is indispensable, especially for people affected by negative emotions. As indicated in relevant studies, negative emotions can lead to mental well-being issues. To maintain mental health, people need to self-reflect on negative emotional moments, and people also need to find what evokes those emotions so exposure to those causes can be minimized. In aspects, having the ability to record emotional moments, retrieve negative emotional moments, and discover their causes, the disclosed systems and method may be used in Emotionship Self-Reflection applications.

Lifelogging is usually considered to be digital self-tracking or recording of everyday life. Life-logging applications may record scenes with commercial glasses like GoPro and Google Clip. It is also difficult to classify or categorize such recordings into different emotional classes categories because those eyewear devices lack emotion awareness. Manually classifying emotional moments is extremely time-consuming and tedious, and the user may not be able to recall the extracted emotional activities. In aspects of the present disclosure, EMOShip may be integrated with lifelogging to produce Emotionship Life-Logging, which can automatically detect emotional moments, record them, and document their causes. In some aspects, Emotionship Lifelogging may also enable various down-stream tasks such as retrieving and classifying emotional moments.

In-field studies may be performed for the two applications described above. In an example in-field study, a total of 20 volunteers, including 14/6 males/females aged between 23 to 40, were recruited to participate in pilot studies. The research goal of understanding the potential causes of emotions was indicated to all participants before the pilot studies. Volunteers were also informed that their daily activities would be recorded for research purposes.

During the in-field studies, participants were introduced to wear EMOShip whenever practical to maximize coverage of their day-to-day lives. EMOShip automatically recorded emotional moments along with their potential (attention-related) visual causes. The complete scene videos taken by the world camera were also saved for reference and are referred to as the baseline video.

The in-field studies lasted for approximately three weeks. At the end of the study, volunteers were asked to assist in to capture. In addition, the participants were asked to complete a questionnaire survey of their opinions on the usability and value of the two emotionship applications.

Table 6 summarizes the system performance of EMOShip in the in-field studies. The participants generated a total of 530.7 minutes of baseline video and 33.8 minutes of 212 emotional video clips. Compared with the overall operation time, $T_{always\text{-}on}$=530.7 min, the operation time reduction for the eye features extraction and high-resolution video capturing are $$84.2\% \left( \frac{T_{always-on} - T_{N_{eye}}}{T_{always-on}} \right) \text{ and } 93.6\% \left( \frac{T_{always-on} - T_{capture}}{T_{always-on}} \right),$$

respectively. That is consistent with the short-term property of non-neutral emotions. Generally, nonneutral emotions are typically aroused by sudden emotional stimuli, and are short-term mental processes that can vanish in a few seconds. In other words, non-neutral emotions are generally more rare than neutral ones in daily life. In an example, data associated with a particular participant may be analyzed for a detailed understanding. In an example, data associated with the participant P6 was examined. One of the scenarios of P6 was watching a basketball game lasting for around 12 minutes, within which the disclosed system has detected 0.4 minutes of non-neutral Emotional Moments (EM). Those EMs occurred exactly when the wearer sees two scoring shots, each one lasting for around 0.2 minute. Given a 30 fps sampling rate, the 2 EMs contain approximate 720 image frames (2×30×0.2×60). Apart from those moments, P6 remained emotionally neutral. EMOShip correctly captured those non-neutral emotional moments.

TABLE 6

| Participant | $T_{always\_on}$ (minute) | $T_{N_{eye}}$ (minute) | $T_{capture}$ (minute) | # of Distinct EM | # of True EM | # of False EM | # of Missed EM | Precision | Recall |
|---|---|---|---|---|---|---|---|---|---|
| P1 | 24.8 | 4.7 | 2.0 | 3 | 17 | 3 | 2 | 85.0% | 89.5% |
| P2 | 28.5 | 5.4 | 3.6 | 2 | 10 | 2 | 1 | 83.3% | 90.9% |
| P3 | 42.5 | 2.7 | 2.0 | 1 | 11 | 1 | 2 | 91.7% | 84.6% |
| P4 | 55.6 | 7.0 | 2.1 | 3 | 19 | 6 | 4 | 76.0% | 82.6% |
| P5 | 32.7 | 3.7 | 2.7 | 2 | 13 | 4 | 3 | 76.5% | 81.3% |
| P6 | 73.2 | 8.9 | 2.2 | 3 | 23 | 7 | 4 | 76.7% | 85.2% |
| P7 | 44.7 | 2.4 | 1.2 | 1 | 8 | 1 | 0 | 88.9% | 100.0% |
| P8 | 17.9 | 1.9 | 1.1 | 1 | 8 | 2 | 3 | 80.0% | 72.7% |
| P9 | 26.9 | 6.9 | 1.2 | 2 | 9 | 3 | 3 | 75.0% | 75.0% |
| P10 | 16.0 | 4.2 | 1.5 | 1 | 7 | 1 | 0 | 87.5% | 100.0% |
| P11 | 17.3 | 4.6 | 1.4 | 4 | 13 | 2 | 3 | 86.7% | 81.3% |
| P12 | 10.9 | 2.7 | 0.6 | 3 | 3 | 0 | 2 | 100.0% | 60.0% |
| P13 | 32.7 | 4.8 | 2.0 | 4 | 13 | 1 | 5 | 92.9% | 72.2% |
| P14 | 14.5 | 2.4 | 1.3 | 2 | 9 | 1 | 0 | 90.0% | 100.0% |
| P15 | 12.3 | 2.9 | 1.5 | 3 | 8 | 1 | 2 | 88.9% | 80.0% |
| P16 | 14.2 | 3.2 | 1.4 | 2 | 8 | 3 | 1 | 72.7% | 88.9% |
| P17 | 11.8 | 3.1 | 1.2 | 1 | 8 | 0 | 1 | 100.0% | 88.9% |
| P18 | 24.2 | 4.0 | 2.2 | 2 | 13 | 2 | 4 | 86.7% | 76.5% |
| P19 | 14.3 | 3.2 | 0.8 | 2 | 4 | 0 | 2 | 100.0% | 66.7% |
| P20 | 15.7 | 5.1 | 1.8 | 3 | 8 | 4 | 1 | 66.7% | 88.9% |
| Mean | | | | | | | | 82.8% | 83.1% | evaluating the value of EMOShip for understanding daily emotions and their causes. In particular, participants were asked to 1) watch the emotional moments captured by EMOShip and mark those clips they believed to have correctly reflected their emotional states and 2) retrieve from the baseline video emotional moments that EMOShip failed Performance of EMOShip may be evaluated based on emotional moments marked by users at the end of the in-field study. Generally, users pay attention to how many emotional moments are correctly recorded by EMOShip, and how many emotional moments are missed or incorrectly recorded. In an example,

27

$$\frac{\text{Number of True } EM}{\text{Number of True } EM + \text{Number of False } EM}$$

may be used to indicate the former, and recall $$\frac{\text{Number of True } EM}{\text{Number of True } EM + \text{Number of Missed } EM}$$

may be used to indicate the latter. In the example illustrated in Table 6, EMOShip delivered 82.8% precision and 83.1% recall on average, which means that EMOShip can accurately capture personal emotional moments, and most of the emotional moments can be captured by EMOShip.

FIG. 11 is a plot of a confusion matrix for the in-field studies. As shown in FIG. 11, EMOShip has high emotional category classification accuracy. Positive emotions (171 of "happiness" and "surprise") are much more frequent than negative ones (53 of "sadness", "anger", "disgust" and "fear"), indicating that positive emotions are the dominate emotional states in the daily lives of the in-field study participants.

To give participants an overall understanding of their past emotional states, the past emotional states may be briefly summarized for each user by roughly categorizing the six basic non-neutral emotional states as positive and negative. For example, "happiness" and "surprise" may be categorized as positive emotional states, while "sadness", "anger", "disgust" and "fear" may be categorized as negative emotional states. For each user, Pr and Nr may be used to denote the proportion of positive emotions and negative emotions, respectively. For a certain time window, two rough emotional patterns may be as follows: i) Type I: Pr>Nr, indicating that the overall emotional state of a user lean towards positive and ii) Type II: Pr≤Nr, suggesting that a user is more frequently occupied by negative emotions. FIG. 12 is a bar chart showing profile of emotional states for all 20 participants in the pilot study. As can be seen in FIG. 12, 17 out of 20 users belong to Type I, while 3 users fall into Type II (P8, P9, and P11), indicating that positive emotions are the dominating emotional states during the pilot studies.

FIG. 13 is a time series showing emotional states of a single participant (P6). FIG. 13 shows the temporally consistent emotional states for a participant (P6). P6 was selected due to being the most active user during the pilot study, leading to 23 emotional clips with a duration of 8.9 minutes covering most of the emotional classes or categories, which provides good opportunities to explore the insight of EMOShip.

As can be seen from FIG. 13, during the whole timeline, the major emotional state is "happiness". This is consistent with the corresponding scenario, i.e., "Scenario #1" in FIG. 13 with the summary tag "A couple of people are playing basketball in a gym". This tag, along with the scenario image, indicates that this user is actually enjoying watching a basketball game and is quite likely to be happy. Referring now to the "surprise" case of "Scenario #2" in FIG. 13, the summary tag, and also the attentive region, indicate that P6 is surprised to see a close-up of a loaf of bread. On the other hand, in the case of "anger" of "Scenario #3" in FIG. 13, the summary tag and attentive region indicate that P6 is driving a car and feels angry due to traffic. Thus, the disclosed system allows a user to easily access various emotional moments that are valuable and personalized. The disclosure system is thus useful in self-reflection applications. For example, if a user (e.g., P6) would like to perform emotionship self-reflection, the anger moments can be retrieved to discover what led to the emotion, e.g., traffic, making it easier to avoid such situations in the future.

In the conducted pilot study, a questionnaire was used to ask study participants about their opinions of the two applications, their wearing experience, and request ideas for improvements. In summary, 16 out of 20 participants provided positive feedback on Emotionship Self-reflection, while 15 out of 20 people saw value in Emotionship Lifelogging.

Below are several illustrative comments from participants. The comments illustrate usefulness of the disclosed system in various emotion analysis applications.

One participant remarked: "From my experience, EMOShip has allowed me to recognize and understand my emotions in a major meeting, which was quite profound to me. When I rewatched the video clips and emotions recorded by EMOShip, I realized that I appeared to be very negative during the meeting, and the meeting was also quite heavy. If I had noticed these issues then, I believe I would have been able to readjust myself to encourage the participation of the team and have a more productive meeting. So I think I will use EMOShip in more meetings and social events. In the long run, it would be significantly beneficial for me to understand and manage my emotions by utilizing EMOShip to analyze my emotions and record my emotional moments."

Similarly, another participant appreciated the application of EMOShip to long-term mood perception and management, as figured out by this volunteer: "EMOShip shows that I have two significantly different states of mind when driving or walking to work. When I commute on foot, the emotions appear to be more positive, and I tend to feel happy more frequently. My driving emotions, on the other hand, often seem to be negative, such as fear and anger I may feel negative or get road rage encountering rule-breaking behaviors such as slow left-lane driving or unsafe lane changes. In addition, with the help of EMOShip I also noticed that I seem to be overly cheerful during business meetings, which may leave an unintended impression of me being unprofessional or unreliable. EMOShip unveils the importance of facial expression management to me. I need to be more aware of my social environment whether I should be more happy or serious."

The third user stated that EMOShip can significantly ease the logging of emotional moments, which can be of importance: "EMOShip can assist me to record some interesting or important moments and my emotions at that time, both of which are crucial for me to get these moments rapidly reviewed. Reviewing the meeting materials that are important to me by watching the videos EMOShip recorded can save me a great amount of time. Plus, my emotions may also shift during interesting moments in life. For example, EMOShip records intense game sessions and sensational videos when I feel happy or sad. It would have been very inconvenient for me to record them manually clip by clip while playing games or watching videos, whereas EMOShip can easily record them for me to review or share quickly afterwards."

Generally, experimental results on the FilmStim dataset of 20 participants demonstrate that the disclosed systems and methods, in an example, capture emotional moments with 80.2% accuracy, significantly outperforming baseline methods. In various examples, the disclosed systems and methods can provide a valuable understanding of the causes of emotions. Example applications using the disclosed systems and methods include, but are not limited to, emotionship self-reflection and emotionship life-logging. A 20-user in-field pilot study demonstrated that most participants think EMOShip helps them reflect on and understand their emo-tions they usually ignore. Most participants indicated that EMOShip was of value to them.

As described above, in various aspects, the disclosed systems and methods recognize emotion states and under-stand their causes. In some aspects, the disclosed systems and methods also provide suggestions on how to reduce the occurrences of negative emotional moments. Because, gen-erally, different people have different situations and hence require personalized service, the disclosed systems and methods may include long-term emotion tracking, emotional management, and regulation systems and techniques. Such include long-term emotion tracking, emotional manage-ment, and regulation systems and techniques may be per-sonalized to suggest how to avoid causes of negative emo-tions, for example.

Although participants are interested in perceiving their emotional states, some participants are uncomfortable with exposing their personal affective information to third parties and/or are worried about the disclosing of their emotional information, especially to malicious third parties. In some aspects, the disclosed systems and methods may address such privacy concerns. For example, enhanced privacy protection of using the disclosed system may be provided and also the safety of recorded personal data may be provided, e.g., in software and/or hardware system compo-nents.

The disclosed systems and methods generally focus on visual stimuli as stimulus for emotions. However, the other senses are also important. For example, the auditory per-ception, like a sharp, annoying sound, can also affect emo-tional states. In some aspects, the disclosed systems and methods may fuse emotionally relevant features from multi-modal data.

FIG. 14 depicts a method 14 for detecting an emotional state of a user, in accordance with one example. The method 1400 may be implemented by one or more of the processors described herein. For instance, the method 1400 may be implemented by an image signal processor implementing an image processing system, such as the system 100 of FIG. 1 or the system 200 of FIG. 2. Additional and/or alternative processors may be used. For instance, one or more acts of the method 1400 may be implemented by an application processor, such as a processor configured to execute a computer vision task.

The method 1400 includes an act 1402 in which one or more procedures may be implemented to obtain a first data stream. The first data stream may be indicative of facial appearance and gaze direction of the user as the user is viewing a scene. The first data stream may include, for example, a plurality of video frames depicting an eye region of a face of the user, eye movement of one or both eyes of the user, eye gaze of the user, etc. as the user is viewing the scene. The first image steam may be obtained from a first sensor, such as an inward-facing camera that may be attached to a smart eyewear frame worn by the subject or other suitable sensor. In an example, the first data stream is obtained from the first sensor 102 of FIG. 1.

At an act 1404, one or more procedures may be performed to determine, based on the first data stream, facial expression feature information indicative of emotional facial expression of the user as the user is viewing the scene. Act 1404 may include an act 1406 at which an eye expression feature vector may be extracted from one or more facial images that may be included in the first data stream. Act 1404 may also include an act 1408 at which pupil information may be extracted from the one or more facial images included in the first data stream, and an eye feature vector that includes the eye expression feature vector concatenated with the pupil information may be generated.

At an act 1410, one or more procedures may be imple-mented to obtain a second data stream. The second data stream may be indicative of visual content in the field of view of the user. The second data stream may include one or more images or video frames capturing visual content in the field of view of the user, for example. The second data steam may be obtained from a second sensor, such as a forward-facing camera that may be attached to the smart eyewear frame worn by the subject. In an example, the second data stream may be obtained from the second sensor 104 of FIG. 1.

At an act 1412, one or more procedures may be performed to determine visual feature information indicative of visual content in the scene based on the first data stream and the second data stream. Act 1412 may include an act 1414 at which a plurality of potential regions of interest may be identified in the image. In an example, act 1414 may also include generating, based on the second data stream, visual feature vectors and semantic feature vectors corresponding to the regions of interest identified in the scene. In an example, the act 1414 may include applying a vision-language (VL) engine (e.g., a vision-language neural net-work) to the second data stream (e.g., one or more scene images included on the second data stream) to extract multiple (e.g., all potential) regions of interest and generate semantic tags. In other examples, other suitable techniques may be utilized at act 1414 identify the plurality of regions of interest and/or to obtain the corresponding semantic tags.

Act 1414 may further include an act 1416 at which a subset of the plurality of identified regions of interest may be selected based on a gaze point of the user. The gaze point of the user may be determined based on the first data stream. In an example, a predetermined number K (e.g., 10 or another suitable number) of regions of interest having embeddings with shortest distance (e.g., Euclidean distance or another suitable distance) from the gaze point as com-pared to other regions of interest. In other examples, other suitable selection mechanisms may be utilized.

Act 1414 may also include an act 1418 at which a concatenated feature vector that includes the eye feature vector and the visual feature vectors corresponding to the selected regions of interest may be generated, and a scaling vector based on the concatenated feature vector may be determined. The scaling vector may contain weights corre-sponding to importance of the features in the concatenated feature vector. In an aspect, the scaling factor may be determined by applying a Squeeze-and-Excitation neural network to the concatenated feature vector. In other example, the scaling vector may be determined using other suitable techniques. In an example, the scaling vector may be used to reveal the emotional impact from visual attention in the field of view of the user.

At an act 1420, one or more procedures may be imple-mented to determine emotional state information indicative of the emotional state of the user. The emotional state formation may be determined based on analyzing the facial expression feature information determined based on the first data stream and the visual feature information determined based on the second data stream. Act 1420 may include generating a weighted concatenated feature vector by per-forming a channel-wise multiplication between the concatenated feature vector and the scaling vector. The weighted concatenated feature vector may then be classified into a particular emotional state among a plurality of predetermined emotional state categories. In an example, six emotional state classes or categories—happiness, sadness, fear, anger, disgust, and surprise—may be utilized. In other example, other suitable emotional state classes or categories may additionally or alternatively be utilized.

In some examples, act 1420 may also include determining a semantic representation of visual content in one or more regions in the scene. Determining the semantic representation may include an act 1426 at which a visual attention region in the scene may be determined. In an example, the visual attention region may be selected from the subset of regions of interest selected at act 1416. For example, an answer to the question "what object makes people feel certain emotions (e.g., happiness, sadness, fear, anger, disgust, and surprise) based on applying a neural network (e.g., a vision-language fusion neural network) to the visual feature vectors and semantic feature vectors corresponding to the selected regions of interest in the scene. Then, a semantic feature vector having an embedding with a shortest distance to the obtained answer may be identified, and the corresponding region of interest may be determined to be the visual attention region in the scene. Determining the semantic representation may also include an act 1428 at which the sematic representation summarizing visual content of the visual attention regions may be generated. For example, a summary tag summarizing visual content in the visual attention region in the scene may be generated. In an example, a neural network (e.g., a vision-language fusion neural network) may be applied to the visual feature vector corresponding to the visual attention region in the scene to generate the summary tag summarizing visual content in the visual attention region in the scene. In other examples, other suitable captioning techniques may be utilized. In some examples, acts 1426 and 1424 may be omitted.

At an act 1430, an operation is performed with respect to the emotional state information determined at the act 1420. Act 1430 may include, for example, an act 1432 at which one or more of the following may be performed: i) inferring further information from the emotional state information, ii) causing one or both of the emotional state information and the information further inferred from the emotional state information to be provided to the user, or iii) storing, in a memory, one or both of the emotional state information and the further information inferred from the emotional state information for subsequent use. In other examples, act 1430 may additionally or alternatively include other suitable operations with respect to (e.g., using) the emotional state information. Inferring further information may include, for example, inferring what (e.g., what visual content) affects emotional state and/or mood of the user, tracking mood of the user, inferring visual content that should be logged or otherwise recorded for the user, inferring causes of emotional state that should be logged or otherwise recorded in association with the visual content, inferring how visual content may generally affect people's emotional state and/or mood, etc. In some examples, an indication of the emotional state of the user detected at act 1420 and/or the semantic representation of the visual content in the visual attention region in the scene generated at act 1424 may be stored in a memory and/or provided to the user. In cases in which the semantic representation of the visual content in the visual attention region in the scene is provided to the user, the semantic representation may indicate a cause for the detected emotional state of the user. In an example, the indication of the emotional state of the user and/or the semantic representation of the visual content in the visual attention region in the scene may be provided to the user and/or stored in a memory in a self-reflection or a life-logging application. In other example, the indication of the emotional state of the user and/or the semantic representation of the visual content in the visual attention region in the scene may be provided to the user and/or stored in a memory in other suitable scenarios and applications.

FIG. 15 is a block diagram of a computing system 1500 with which aspects of the disclosure may be practiced. The computing system 1500 includes one or more processors 1502 (sometimes collectively referred to herein as simply "processor 1502") and one or more memories 1504 (sometimes collectively referred to herein as simply "memory 1504") coupled to the processor 1502. In some aspects, the computing system 1500 may also include a display 1506 and one or more storage devices 1508 (sometimes collectively referred to herein as simply "storage device 1508" or "memory 1508"). In other aspects, the system 1500 may omit the display 1506 and/or the storage device 1508. In some aspects, the display 1506 and/or the storage device 1508 may be remote from the computing system 1500, and may be communicatively coupled via a suitable network (e.g., comprising one or more wired and/or wireless networks) to the computing system 1500. The memory 1504 is used to store instructions or instruction sets to be executed on the processor 1502. In this example, training instructions 1510 and emotion analysis instructions 1512, which may include expression analysis instructions 1522 and/or visual-language analysis/fusion instructions 1524, are stored on the memory 1504. The emotion-analysis instructions 512 may include instructions for implementing one or more neural networks such as an eye feature neural network (e.g., the $\mathcal{N}_{eye}$ engine described above), a vision-language neural network (e.g., the $\mathcal{N}_{VL}$ engine described above), a vision-language fusion neural network (e.g., the $\mathcal{N}_{OS}$ engine described above), and a squeeze-and-execution neural network (e.g., the $\mathcal{N}_{SE}$ engine described above). The instructions or instruction sets may be integrated with one another to any desired extent. In an aspect, a set of machine-learned networks or other engines is stored on the storage device 1508. The set of trained machine-learned networks or other engines may include a complete predictor, a rationale generator, a rationale generator and/or a causal attention generator as described herein, for example.

The execution of the instructions by the processor 1502 may cause the processor 1502 to implement one or more of the methods described herein. In this example, the processor 1502 is configured to execute the training instructions 1510 to train various neural networks, such as an eye feature neural network (e.g., the $\mathcal{N}_{eye}$ engine described above), a vision-language neural network (e.g., the $\mathcal{N}_{VL}$ engine described above), a vision-language fusion neural network (e.g., the $\mathcal{N}_{OS}$ engine described above), and a squeeze-and-execution neural network (e.g., the $\mathcal{N}_{SE}$ engine described above) by the computing system 1500. The processor 1502 is configured to execute the attention session detection instructions 1512 to detect an attention session based on data input streams. The processor 1506 is configured to execute the causal attention determination instructions 1514 to determine causal attention in the detected attentions session and generate a causal attention output indicating the causal attention. In various examples, the processor 1506 may be configured to execute the output instructions 1516 to cause the causal attention output to be provided to a user, e.g., via the display 1510 and/or to be stored in the storage device 1508, for example.

The computing system 1500 may include fewer, additional, or alternative elements. For instance, the computing system 1500 may include one or more components directed to network or other communications between the computing system 1500 and other input data acquisition or computing components, such as sensors (e.g., an inward-facing camera and a forward-facing camera) that may be coupled to the computing system 1500 and may provide data streams for analysis by the computing system 1500.

The term "about" is used herein in a manner to include deviations from a specified value that would be understood by one of ordinary skill in the art to effectively be the same as the specified value due to, for instance, the absence of appreciable, detectable, or otherwise effective difference in operation, outcome, characteristic, or other aspect of the disclosed methods and devices.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method for detecting an emotional state of a user, the method comprising:

obtaining, by a processor, a first data stream indicative of facial appearance and gaze direction of the user as the user is viewing a scene;

determining, by the processor based on the first data stream, a facial expression feature vector indicative of emotional facial expression of the user as the user is viewing the scene;

obtaining, by the processor, a second data stream indicative of visual content in a field of view of the user as the user is viewing the scene;

determining, by the processor based on the second data stream, a visual content feature vector indicative of visual content in the scene;

fusing, by the processor, the facial expression feature vector with the visual content feature vector to generate a fused feature vector that includes fused features of both the emotional facial expression of the user and the visual content in the scene;

analyzing, by the processor, the fused feature vector using a neural network trained to provide a scaling vector, the scaling vector including respective scalars that reflect respective degrees of importance of respective channels in the fused feature vector;

determining, by the processor, emotional state information based on analyzing the fused feature vector scaled based on the scaling vector; and performing, by the processor, an operation with respect to the emotional state information, wherein the emotional state information is indicative of the emotional state of the user.

2. The method of claim 1, wherein performing the operation with respect to the emotional state information comprises performing one or more of i) inferring, by the processor, further information from the emotional state information, ii) causing, by the processor, one or both of the emotional state information and the further information inferred from the emotional state information to be provided to the user, or iii) storing, by the processor in a memory, one or both of the emotional state information and the further information inferred from the emotional state information for subsequent use.

3. The method of claim 1, wherein determining the emotional state information includes:

determining, based on the second data stream, semantic information corresponding to the visual content in the scene, identifying, based on the visual content feature vector indicative of the visual content in the scene and the semantic information corresponding to the visual content in the scene, a visual attention region of interest in the scene, and generating a semantic representation summarizing the visual content in the visual attention region of interest in the scene, wherein the semantic representation indicates a cause for the emotional state of the user.

4. The method of claim 1, wherein:

obtaining the first data stream comprises obtaining one or more images depicting an eye region of a face of the user, and determining the facial expression feature vector includes:

extracting eye expression features and eye pupil information from the one or more images depicting the eye region of the face of the user, and generating an eye feature vector that includes the eye expression features concatenated with the eye pupil information.

5. The method of claim 4, further comprising:

prior to obtaining the second data stream, detecting, by the processor based on the eye feature vector, a non-neutral emotional state of the user, and in response to detecting the non-neutral emotional state of the user, triggering, by the processor, capture of the second data stream to capture the visual content in the field of view of the user.

6. The method of claim 5, wherein detecting the non-neutral emotional state of the user comprises classifying the eye feature vector into one of a neutral emotional state of the user and the non-neutral emotional state of the user.

7. The method of claim 4, wherein determining the visual content feature vector based on the second data stream includes:

identifying, based the second data stream, a plurality of regions of interest in the scene, obtaining respective visual feature vectors corresponding to the plurality of regions of interest in the scene, and selecting a predetermined number of regions of interest that are closest to a gaze point of the user, wherein the gaze point of the user is determined based on the first data stream.

8. The method of claim 7, wherein:

fusing the facial expression feature vector with the visual content feature vector includes generating a concatenated feature vector including the eye feature vector concatenated with the respective visual feature vectors corresponding to the predetermined number of regions of interest that are closest to the gaze point of the user, analyzing the fused feature vector includes determining, based the concatenated feature vector, the scaling vector comprising importance scalars for respective features of the concatenated feature vector, and generating a weighted concatenated feature vector by channel-wise multiplication between the scaling vector and the concatenated feature vector, and determining the emotional state includes classifying the weighted concatenated feature vector into an emotional state classes among a plurality of predetermined emotional state classes.

9. The method of claim 8, wherein determining the emotional state information further includes:

determining, based on the second data stream, respective semantic feature vectors corresponding to the regions of interest that are closest to the gaze point of the user, identifying, based on the respective visual feature vectors and the respective semantic feature vectors corresponding to the regions of interest that are closest to the gaze point of the user, a visual attention region of interest that evokes the emotional state of the user, and generating, based on a visual feature vector corresponding to the visual attention region of interest in the scene, a semantic representation summarizing the visual content in the visual attention region of interest in the scene, wherein the semantic representation indicates a cause for the emotional state of the user.

10. The method of claim 9, wherein determining the emotional state information further includes determining, based on the scaling vector, an influence score indicating a degree of emotional impact of the visual content on the user, and wherein generating the semantic representation comprises generating the semantic representation when the degree of emotional impact exceeds a predetermined threshold.

11. A method for detecting an emotional state of a user, the method comprising:

obtaining, by a processor, a first data stream indicative of facial appearance and gaze direction of the user as the user is viewing a scene;

determining, by the processor based on the first data stream, a facial expression feature vector indicative of emotional facial expression of the user as the user is viewing the scene;

obtaining, by the processor, a second data stream indicative of visual content in a field of view of the user as the user is viewing the scene;

determining, by the processor based on the second data stream, a visual content feature vector indicative of the visual content in the scene;

fusing, by the processor, the facial expression feature vector with the visual content feature vector to generate a fused feature vector that includes fused features of both the emotional facial expression of the user and the visual content in the scene;

analyzing, by the processor, the fused feature vector using a neural network trained to provide a scaling vector, the scaling vector including respective scalars that reflect respective degrees of importance of respective channels in the fused feature vector;

determining, by the processor, emotional state information based on analyzing the fused feature vector scaled based on the scaling vector, wherein the emotional state information i) is indicative of the emotional state of the user and ii) includes a semantic representation of the visual content in the scene, wherein the semantic representation indicates a cause for the emotional state of the user; and performing, by the processor, an operation with respect to the emotional state information.

12. The method of claim 11, wherein performing the operation with respect to the emotional state information comprises performing one or more of i) inferring, by the processor, further information from the emotional state information, ii) causing, by the processor, one or both of the emotional state information and the information further inferred from the emotional state information to be provided to the user, or iii) storing, by the processor in a memory, one or both of the emotional state information and the further information inferred from the emotional state information for subsequent use.

13. The method of claim 11, wherein:

obtaining the first data stream comprises obtaining one or more images depicting an eye region of a face of the user, and determining the facial expression feature vector includes:

extracting eye expression features and eye pupil information from the one or more images depicting the eye region of the face of the user, and generating an eye feature vector that includes the eye expression features concatenated with the eye pupil information.

14. The method of claim 13, wherein:

determining the visual content feature vector includes identifying, based the second data stream, a plurality of regions of interest in the scene, and obtaining respective visual feature vectors corresponding to the plurality of regions of interest in the scene, fusing the facial expression feature vector with the visual content feature vector includes selecting a predetermined number of regions of interest that are closest to a gaze point of the user, wherein the gaze point of the user is determined based on the first data stream, and generating a concatenated feature vector including the eye feature vector concatenated with the respective visual feature vectors corresponding to the regions of interest that are closest to a gaze point of the user, analyzing the fused feature vector includes determining, based the concatenated feature vector, the scaling vector comprising importance scalars for respective features of the concatenated feature vector, and generating an importance weighted vector by channel-wise multiplication between the scaling vector and the concatenated feature vector, and determining the emotional state information includes classifying the concatenated feature vector into an emotional state class among a plurality of predetermined emotional state classes.

15. A system comprising:

a first sensor configured to generate a first data stream indicative of facial appearance and gaze direction of a user as the user is viewing a scene;

a second sensor configured to generate a second data stream indicative of visual content in a field of view of the user as the user is viewing the scene; and an emotion analysis engine implemented on one or more integrated circuits, the emotion analysis engine configured to:

obtain the first data stream from the first sensor;

determine, based on the first data stream, a facial expression feature vector indicative of emotional facial expression of the user as the user is viewing the scene;

obtain the second data stream from the second sensor;

determine, based on the second data stream, a visual content feature vector indicative of the visual content in the scene;

fuse the facial expression feature vector with the visual content feature vector to generate a fused feature vector that includes fused features of both the emotional facial expression of the user and the visual content in the scene;

analyze the fused feature vector using a neural network trained to provide a scaling vector, the scaling vector including respective scalars that reflect respective degrees of importance of respective channels in the fused feature vector;

determine emotional state information based on analyzing the fused feature vector scaled based on the scaling vector, wherein the emotional state information is indicative of an emotional state of the user; and perform an operation with respect to the emotional state information.

16. The system of claim 15, wherein emotion analysis engine is configured to perform the operation with respect to the emotional state information at least by performing one or more of i) inferring further information from the emotional state information, ii) causing one or both of the emotional state information and the information further inferred from the emotional state information to be provided to the user, or iii) storing, in a memory, one or both of the emotional state information and the further information inferred from the emotional state information for subsequent use.

17. The system of claim 15, wherein the emotion analysis engine is configured to:

apply a vision-language neural network to the second data stream to obtain semantic information corresponding to the visual content in the scene, identify, based on the visual content feature vector indicative of the visual content in the scene and the semantic information corresponding to the visual content in the scene, a visual attention region of interest in the scene, and apply a vision-language fusion neural network to data, in the second data stream, corresponding to the visual attention region of interest in the scene to obtain a semantic representation summarizing the visual content in the visual attention region of interest in the scene.

18. The system of claim 15, wherein:

the first data stream comprises one or more images depicting an eye region of a face of the user, and the emotion analysis engine is configured to:

extract eye expression features and eye pupil information from the one or more images depicting the eye region of the face of the user, and generate an eye feature vector that includes the eye expression features concatenated with the eye pupil information.

19. The system of claim 18, wherein the emotion analysis engine is configured to:

prior to obtaining the second data stream, detect, based on the eye feature vector, a non-neutral emotional state of the user, and in response to detecting the non-neutral emotional state of the user, trigger capture of the second data stream to capture the visual content in the field of view of the user.

20. The system of claim 19, wherein the emotion analysis engine is configured to:

apply a visual-language neural network to the second data stream to identify a plurality of regions of interest in the scene and obtain respective visual feature vectors corresponding to the plurality of regions of interest in the scene, determine a gaze point of the user based on the first data stream, select a predetermined number of regions of interest that are closest to the gaze point of the user, generate a concatenated feature vector including the eye feature vector concatenated with the respective visual feature vectors corresponding to the regions of interest that are closest to a gaze point of the user, determine, based the concatenated feature vector, the scaling vector comprising importance scalars for respective features of the concatenated feature vector, generate an importance weighted vector by channel-wise multiplication between the scaling vector and the concatenated feature vector, and classify the concatenated feature vector into an emotional state class among a plurality of predetermined emotional state classes.

* * * * *